United States Patent [19]
Forward et al.

[11] Patent Number: 6,116,544
[45] Date of Patent: Sep. 12, 2000

[54] ELECTRODYNAMIC TETHER AND METHOD OF USE

[75] Inventors: Robert L. Forward, Houston, Tex.;
Robert P. Hoyt, Seattle, Wash.

[73] Assignee: Tethers Unlimited, Inc., Seattle, Wash.

[21] Appl. No.: 08/929,271

[22] Filed: Sep. 12, 1997

[51] Int. Cl.[7] .................................................. B64G 1/00
[52] U.S. Cl. ..................... 244/158 R; 244/166; 244/172
[58] Field of Search ............................... 244/158 R, 164, 244/166, 172

[56] References Cited

U.S. PATENT DOCUMENTS

| | | | |
|---|---|---|---|
| 4,097,010 | 6/1978 | Colombo et al. | 244/158 R |
| 4,824,051 | 4/1989 | Engelking | 244/158 R |
| 4,923,151 | 5/1990 | Roberts | 244/158 R |

OTHER PUBLICATIONS

"Tethers Open New Space Options" by Ivan Bekey, *Astronautics & Aeronautics*, 1983.

*Primary Examiner*—J. Woodrow Eldred
*Attorney, Agent, or Firm*—Arthur M. Dula

[57] ABSTRACT

The present invention comprises an electrodynamic tether structure and a method of use. The structure of the tether taught by the present invention is a short, wide, interconnected multiwire (compared to the long, narrow single wires of the prior art) conductive tether whose area maximizes electrodynamic drag while simultaneously minimizing the Area-Time-Product swept by the tether during its operating life. The preferred tether length is two kilometers to five kilometers. The preferred tether mass is one percent to five percent of the spacecraft mass. The method of operation comprises orienting the tether structure at an angle to the local vertical to maximize electrodynamic drag on the host spacecraft and minimize tether instability. The angle of 35.26 degrees is preferred.

26 Claims, 12 Drawing Sheets

$\tau = 35.26°$

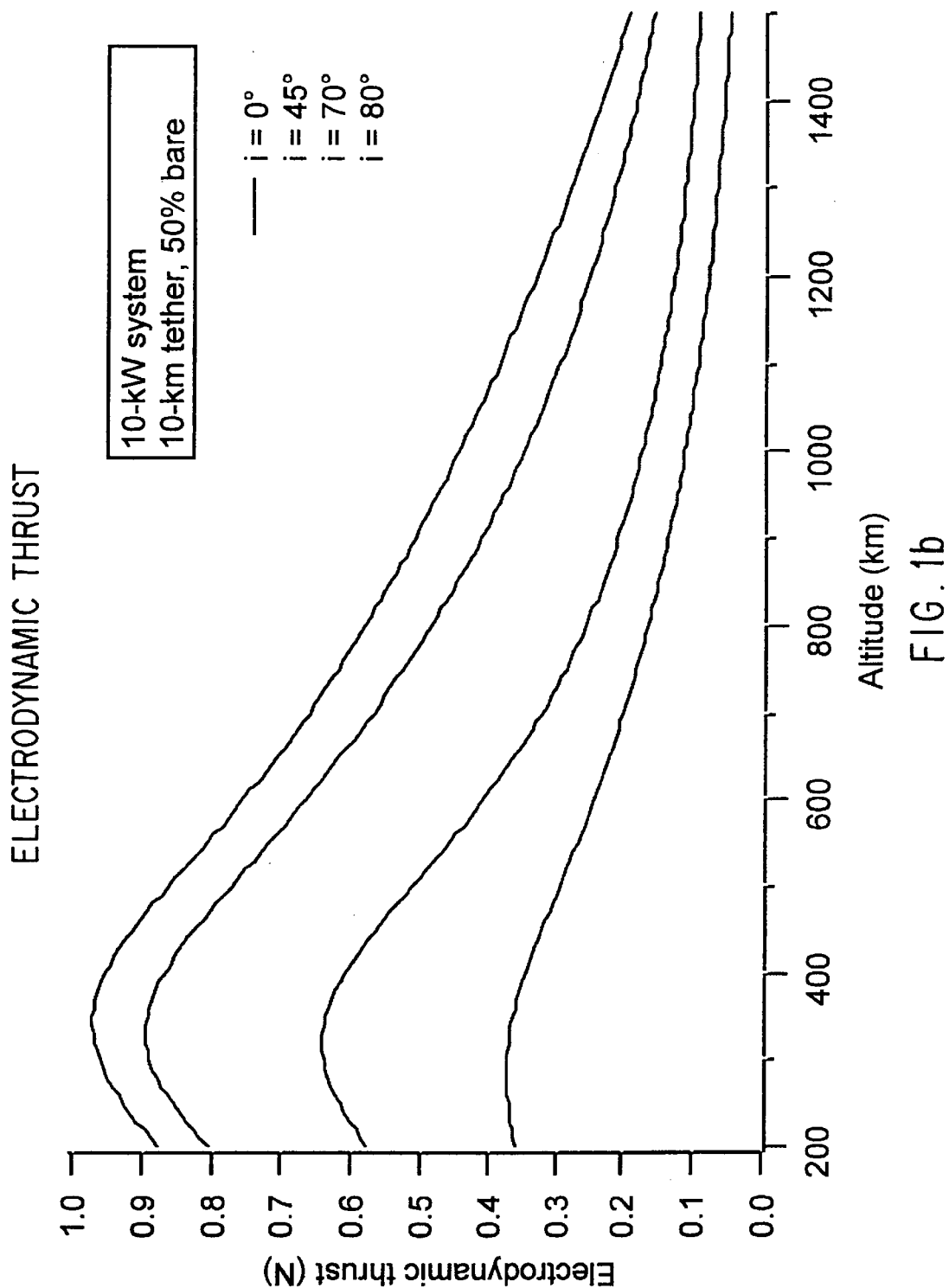

Area-Time Product for Mean and Extremes of Exospheric Temperature (m = 1000 kg, Cd = 2.0 ; 1% Tether, 1 km x 25 cm; power = 1077 watts)

(5% Tether, 1 km x 25 cm; power =5385 watts)

Conventional Solid Rocket Motor System

Percent Increase in Orbital Mass vs. Altitude and l' (Isp = 288 sec)

FORCES AND TORQUES ON AN UPWARD DEPLOYED CONDUCTING TETHER DUE TO THE MOTION OF THE HOST SPACECRAFT THROUGH THE MAGNETIC FIELD OF THE EARTH.

ELECTRODYNAMIC TETHER AND METHOD OF USE

TECHNICAL FIELD

This invention relates generally to apparatus and methods useful for changing the state vector of a space object when the space object is moving relative to a magnetic field. More specifically, the present invention relates to an apparatus and method of using a conducting tether to produce an electrodynamic force to deorbit a satellite from its orbit around a celestial body, such as the Earth, which has an associated magnetic field.

RESERVATION OF RIGHTS

This application is subject to certain rights of the U.S. government as a result of contracts between the U.S. government and the inventors.

BACKGROUND ART

The present invention has its principal utility in outer space, primarily for deorbiting satellites at the end of their useful life to mitigate the harm and reduce the liability created by the proliferation of space debris. In order to obtain a better understanding of the present invention it is helpful to understand the prior art of space tethers, especially tether dynamics and tether electrodynamics. The present invention may be more readily understood through a review of the experimental prior art and a mathematical analysis of electrodynamic space tethers.

Prior Art Tethers:

A tether was originally a rope or chain used to fasten an animal so that it grazed only within certain limits. Tethers have been used for decades in space to attach astronauts to their spacecraft.

In 1974 Professor Guiseppe Colombo, holder of the Galileo chair of astronomy at the University of Padua in Italy, proposed using a long tether to support a satellite from an orbiting platform. U.S. Pat. No. 4,097,010, which issued to Professor Colombo and Mario Grossi on Jun. 27, 1978, teaches a satellite connected by means of a long tether to a powered spacecraft. Colombo actively pursued the design of a tethered satellite system.

Several NASA experiments, such as the two Small Expendable Deployer System (SEDS 1 & 2) experiments and the Plasma Motor Generator (PMG) experiment used tethers in space. SEDS used a nonconducting tether. The PMG used a 500-meter conducting tether. The Tethered Satellite System flights in 1992 and 1996 (TSS-1 & 1R) used a 20,000-meter conducting tether.

On the TSS-1 mission the tether deployed only 260 meters (853 feet) before the deployer failed. On the TSS-1R the tether was deployed 19,500 meters. In the SEDS-2 flight, a 0.8-mm diameter, 20,000-meter long braided single-line tether was deployed to study tether dynamics and lifetime. Orbital debris or a meteoroid severed this tether in less than four days.

In the TSS-1R flight, the conducting single-line tether was severed after five hours of deployment. This failure was caused by an electric arc produced by the 3,500 volts of electric potential generated by the conductive tether's movement through the Earth's magnetic field.

The Tether Physics and Survivability (TiPS) satellite consists of two end masses connected by a 4,000-meter long non-conducting tether. This satellite was deployed on Jun. 20, 1996 at an altitude of 1,022 kilometers (552 nautical miles). Its tether is an outer layer of Spectra™ 1000 braid over a core of acrylic yarn. The yarn will "puff" its outer braid to two millimeters to "give it a larger cross section to improve its resistance to debris and small micrometeoroids", according to the National Reconnaissance Office (NRO), which is a sponsor of the TiPS mission. As of Jun. 21, 1997 the TiPS tether had survived one year.

References:
1. Joseph A. Carroll, "SEDS Deployer Design and Flight Performance", paper WSEDSA-1 at the $4^{th}$ International Conference on Tethers in Space, Washington, D.C., April 1995.
2. James E. McCoy, et. al. "Plasma Motor-Generator (PMG) Flight Experiment Results", pp.57–84, Proceedings of the $4^{th}$ International conference on Tethers in Space, Washington, D.C., April 1995.
3. W. John Raitt, et. al. "The NASA.ASI-TSS-1 Mission, Summary of Results and Reflight Plans, pp. 107–118, Proceedings of the $4^{th}$ International conference on Tethers in Space, Washington, D.C., April 1995.
4. Joseph C. Anselmo, "NRO Orbiting Spacecraft Studies Tether Survivability", Aviation Week, page 24, Jul. 1, 1996.

These experiments all used single line tethers.

The following reference is illustrative of the current state of the art in space tethers: Paul A. Penzo and Paul W. Ammann. Tethers in Space Handbook—Second Edition. NASA Office of Space Flight, NASA Headquarters, Washington, D.C. 20546. See also the hundreds of references in the 33 page bibliography at the end of the handbook.

The "Hoytether"™, an Improved, High-Reliability Tether:

In 1991, one of the present inventors, Robert Hoyt, invented a lightweight net-like structure that provides many redundant load-bearing paths. A number of primary load bearing lines running the length of the structure are connected periodically by diagonal secondary lines. The disclosed embodiment of this invention has the secondary lines firmly connected by knots to the primary lines. The secondary lines are connected only to the primary lines. At either end of the disclosed structure, a support ring enforces the cylindrical spacing between the primary lines. The secondary lines are designed with a small amount of slack. These secondary lines are only put under load if a primary line fails. This specific tether structure was disclosed to the public in 1992 (Forward, R. L., "Failsafe Multistrand Tether Structures for Space Propulsion", AIAA paper 92–3214, $28^{th}$ Joint Propulsion Conference, Nashville, Tenn., 1992 (hereinafter "1992 Hoytether structure"). This structure was named a "Hoytether". The term "Hoytether" is used throughout the remainder of this specification for this type of tether structure.

The present invention uses an improved Hoytether, which was invented by the same inventors as the present invention. This improved Hoytether is the subject of a copending PCT application. The Hoytether is discussed briefly in this specification to aid understanding of the present invention.

The 1992 Hoytether design teaches that the normally slack secondary lines have half the cross-section (0.707 the diameter) of the primary lines. There are twice as many secondary lines as primary lines, thus the mass of the secondary lines is equal to the mass of the primary lines. In an undamaged Hoytether, the primary lines carry the entire load, while none of the secondary lines are under load.

While the survival probability of a single-line tether decreases exponentially with time, the Hoytether can maintain a high, i.e. greater than 99 percent, survival probability for periods of months or years (forward and Hoyt, "Failsafe Multiline Hoythther Lifetimes", Paper AIAA 95–2890, 31$^{st}$ Joint Propulsion Conference, July 1995).

References:
1. Robert L. Forward, Failsafe Multistrand Tethers for Space Propulsion, Forward Unlimited, P.O. Box 2783, Malibu, Calif. 90265, July 1992, Final Report on NASA Contract NAS8-39318 SBIR 91-1 Phase I.
2. Robert L. Forward and Robert P. Hoyt, Failsafe Multistrand Tether SEDS Technology Demonstration, Final Report on NAS8-40545 with NASA/MSFC (Jun. 14, 1995).
3. Robert L. Forward and Robert P. Hoyt, "High Strength-to-Weight Tapered Hoytether for LEO to GEO Payload Transfer" Final Report on contract number NAS8-40690 with NASA/MSFC (Jul. 10, 1996).

The Hoytether is essentially a tri-axial net structure, with 'primary' lines running along the length of the tether and two sets of 'secondary' lines connecting these primaries diagonally. They can be made by hand and connected with knots as is taught by the 1992 Hoytether structure. Because knotted connections severely limit the strength of a structure, it is desirable to use a knotless fabrication technique to achieve interconnections that have strengths approaching the limits of the constituent material. As these tethers may be many kilometers long; fast and inexpensive mechanical methods are required for their practical fabrication.

Hoytethers may be made by mechanical braiding, i.e. three-dimensional braiding, such as 3-D rotation braiding using braiding machines such as those developed by the Herzog Company in Germany (August Herzog Maschinenfabrik GmbH & Co., Postfach 2260.26012, Oldenburg, Germany. The specialized loom developed by the Nichimo Company of Japan (Nichimo Company Ltd., 2-6-2 Ohtemachi, Chiyoda-Ku, Tokyo, Japan) is used to produce "Ultracross" knotless fishing nets in which the individual strands are braided as a 4-braid line, and the strands are interbraided where they cross. This produces netting that has slipless interconnections that are very strong, approaching the maximum capability of the fiber. Such a loom could, with some modifications, produce the present invention's structure. Only two such machines exist, one in Japan, the other in Washington State. Unfortunately neither can work with the small line diameters needed to practice the preferred embodiment of the present invention. See generally, Ko, F. K., "Braiding", in *Engineered Materials Handbook, Vol. 1., Composites*. ASM International, Metals Park, Ohio, 1957. Pp. 519–528.

The most common 3-dimensional braiding machines are 4-step braiders based upon the designs of Maistre (German Patent P230-16986, issued 1973) and Forentine (U.S. Pat. No. 4,312,261, issued 1982). Braiding is accomplished by using pneumatics or solenoids to push the parts of the braiding machine to the proper positions. This is a slow process and making a Hoytether kilometers long with these machines would be very time consuming and expensive. The composites division of Albany International (Albany International Research Company, 777 West Street, Mansfield, Mass.) also produces a 3-D braiding machine. This machine uses modular braiding components that arc assembled breadboard fashion on a large wall.

Although braiding is the preferred technique, alternate fabrication methods such as Raschel knitting and crocheting can be used successfully. Multikilometer long Hoyththers are presently being produced for the inventors by the vendors Culzean Fabrics and Flemings Textiles using an electronically controlled crochet machine produced by Comez in Italy.

Space Tether Systems:

The prior art teaches the use of tethers in space applications. U.S. Pat. No. 5,163,641, issued on Apr. 9, 1990 to Yasaka, teaches the use of a powered spacecraft connected by a tether to a satellite. This tether is disconnected to change the state vector of the satellite. The state of the art of energy and momentum transfer using space tethers is discussed in Ivan Beckey's article "Tethering, a new Technique for Payload Deployment", Aerospace America, March 1997, at pages 36–40. Beckey concludes, "Tethers can perform the same functions as propulsive upper stages of direct payload injection, but at lower weight and cost per pound." U.S. Pat. No. 4,923,151, issued Mar. 1, 1988 to Roberts, Wilknson and Webster, teaches a tether power generator for earth orbiting satellites. U.S. Pat. No. 4,580,747, issued Mar. 15, 1983 to Pearson, teaches use of a long tether extending downward into the atmosphere from a satellite. The state vector of the satellite is changed by forces acting on a lifting body connected to the end of the tether. U.S. Pat. No. 4,824,051, issued Jan. 12, 1987 to Engelking, teaches passing an electric current through a conductive tether attached to a satellite to provide propulsive force to alter the orbit of the satellite. U.S. Pat. No. 5,082,211, issued Jan. 21, 1992 to Werka, teaches use of a tether to deorbit space debris. U.S. Pat. No. 4,727,373, issued Mar. 31, 1986 to Hoover, teaches an orbiting stereo imaging radar system having two spacecraft in synchronous parallel orbits connected by a tether.

Tether Dynamics:

In order to understand the forces that cause a tethered satellite to move upward and away from an orbiting satellite, for example, it is first necessary to explain briefly how a satellite remains in orbit. An orbiting satellite is acted on by the force of gravity which pulls it toward Earth, and by a centrifugal force, which pushes it away from Earth. The centrifugal force" (actually inertia) results from the motion of the satellite around its circular orbit. This is the same force that one can experience by swinging a ball around on the end of a string. A satellite is maintained in its orbit when it travels at the natural speed for its altitude and, as a result, the centrifugal force is equal to the gravitational force.

At the typical orbital altitude of 250 kilometers for a low-Earth orbit satellite, for example, a speed of approximately 7.6-km per second is required to create sufficient centrifugal force to balance gravitational attraction on the satellite. If the altitude is changed, the two opposing forces will no longer be in balance unless the satellite also changes its speed. A higher orbital altitude requires a slightly lower speed so the satellite will take longer to complete an orbit. Because of this, if two free-flying satellites are in orbits at different altitudes, the lower satellite will circle the Earth in less time than the satellite in the higher orbit.

If two satellites, at different altitudes, are connected to each other by a tether, they are forced to travel around their orbits together—in the same period of time, which is longer than the natural period of the lower satellite but shorter than that of the upper satellite. The lower satellite will, therefore, slow down below the natural speed for its orbit and will tend to fall to a lower orbit because the centrifugal force will now be less than the gravitational attraction of the Earth. An upward force in the tether that makes up the difference between centrifugal and gravitational forces holds it in place, however.

Correspondingly, the upper satellite will be accelerated above its natural orbiting speed (increasing its centrifugal force above the gravitational attraction) and will tend to move to a higher orbit. It, too, is held in place by an additional force (downward) in the tether. In other words, the net force downward on the lower satellite is balanced, through the tether, by the net force upward on the upper satellite. The effect of unbalanced forces on the two satellites is, therefore, to create tension in the tether. During the TSS-1 & 1R experiments, the inertia of the tethered satellite causes the satellite to rise above the orbiter as the tether is reeled out. Very close to the orbiter, there is little difference in the two orbits, and the tension force is insufficient to overcome friction in the deployer mechanism; therefore, until the satellite reaches a separation of approximately 1000-meters, the tension is augmented by small tether-aligned thrusters on the satellite. Beyond this point, the tension in the tether is the only force required.

By experimenting with a ball hung on a piece of elastic cord (a paddleball, for example) it is possible to simulate all the different types of oscillations that are possible on a space-based tether system. The elastic cord, representing the tether, may compress and stretch, causing the ball to bounce up and down (longitudinal oscillation). It also may move in a circular (skip-rope) motion or may develop wave-like motions (transverse oscillations). Even if the string itself remains straight, it is possible to get the ball swinging back and forth about its attachment point on the paddle like a child on a swing rope (pendulous motion).

Each type of motion occurs with a particular frequency, which depends on the length and tension of the tether. When the frequencies are different, the motions do not interact; however, at some tether lengths, the frequencies of two or more types of oscillation can become very close. At this point, energy can be transferred from one type of motion to another, a phenomenon known as resonance. For instance, the transverse oscillations in the tether may cause the satellite to swing back and forth in pendulous motion.

Many different factors may cause oscillations; the movements of the satellite or Shuttle are but two of these. For an electrodynamic tether, the skip-rope and pendulous oscillations are of particular interest. If a current is passed through a tether, the current will interact with Earth's magnetic field, resulting in a force that may produce skip-rope and pendulous oscillations. Because it is necessary to maintain control of the satellite, much study has gone into identifying the different types of possible motions and the methods used to control them.

One way to control the magnitude of those motions that cause a change in tension or transverse motion at the end of the tether is to have an end mass connected to the Hoytether that maintains a controlled tension on the tether, working much like a spring-loaded 'dog leash'. This may be as simple as a coiled spring, or as complex as an active control system that measures the tension and transverse forces on the tether and adjusts the applied tension according to a local or remotely operating algorithm.

Electrodynamic Effects of Conductive Tethers:

Electric potential is generated across a conductive tether by its motion through the Earth's magnetic field. Electromagnetic forces acting on a conductive tether in orbit can make the tether system behave like an electric motor or generator, thereby exerting a useful force to alter the state vector of the tether and any mass attached to it.

Electrodynamic tether propulsion is unlike most other types of space propulsion in use or being developed for space application today—there is no hot gas expelled to provide thrust. Instead, the environment of near-Earth space is being utilized to propel a spacecraft or upper stage via electrodynamic interactions.

A charged particle moving in a magnetic field experiences a force that is perpendicular to its direction of motion and the direction of the field. When a current flows through a long, conducting tether the electrons flowing through the tether experience this force due to the fact that they are moving along the wire in the presence of Earth's magnetic field. This force is transferred to the tether and to whatever the tether is attached (like a spacecraft, satellite, space station or upper stage). It can be an orbit-raising thrust force or orbit-lowering drag force, depending upon the direction of current flow. Operation in one mode allows boost from LEO to higher orbit while reversing the current flow provides negative thrust for deboost. The principle is much the same for an electric motor; reverse its operation and it acts as a generator. The current passing through the tether is returned through the ionosphere to complete the current loop with collection and emission occurring on opposite ends of the tether.

The PMG experiment demonstrated that a conducting tether can be used as both a motor and a generator. The TSS experiments, especially TSS-1R showed that very large voltages (about 3500 volts) can be generated by a sufficiently long tether.

Uses of an electrodynamic tether as an orbit raising and lower propulsion system has many advantages over competing systems:

a. It is nearly propellantless. Most other systems expel hot gases and require extensive resupply. To emit current, the electrodynamic tether propulsion system may use plasma contactors developed as a part of the International Space Station Program. These contactors consume less than 20 kg of xenon gas per year with a 50% duty cycle. The electrodynamic tether propulsion system can also use field emitter arrays, which emit electrons without the use of any gas.

b. It can change both altitude and inclination. The Earth's magnetic field is non-uniform and can therefore provide both in- and out-of-plane forces for inclination changes as well as altitude changes. This is of particular interest to payloads requiring polar orbits in that they can be launched on a small launch vehicle into a lower inclination orbit and have it raised in space by the proper phasing of current through the tether.

A demonstration of the propulsive capabilities of electrodynamic tethers was recently approved for a flight test in 1999. The Propulsive SEDS or ProSEDS mission, will fly as a secondary payload on a Delta II launch vehicle and deploy a 5-km conducting tether using the existing SEDS deployer concept. The ProSEDS experiment will be followed by the Electrodynamic Tether Upper Stage (EDTUS) experiment that will demonstrated the use of electrodynamic forces to change both the altitude and inclination of the experimental spacecraft. FIGS. 1B and 1C show the calculated electrodynamic thrust at several inclinations and the reentry time sensitivity of the ProSEDS tether, respectively.

One application for long-life conducting electrodynamic tethers is as a "Terminator Tether™" for removing from orbit unwanted Earth orbiting spacecraft at the end of their useful lives. When the mission of the satellite is completed, the Terminator Tether™, weighing a small fraction of the mass of the satellite, would be deployed. The electrodynamic interaction of the conducting tether with the Earth's magnetic field will induce current flow in the tether conductor. The resulting energy loss from the heat generated by the current flowing through the ohmic resistance in the conducting tether will remove energy from the spacecraft, eventually causing it to deorbit, thus reducing the amount of orbital space debris that must be coped with in the future.

In the following analysis, it is shown that the amount of energy loss generated by an electrodynamic tether is essentially independent of its length or area, and instead is primarily proportional to the tether mass and the physical properties of the conductor metal chosen. In the typical example calculated, a 1000-kg spacecraft can be deorbited from a 1000-km high Earth orbit by a 10-kg mass tether in a month, while a 1-kg tether can deorbit a 1000-kg spacecraft in less than a year.

To the knowledge of the inventors, Joseph P. Loftus of NASA/JSC first proposed the general concept of using an electrodynamic tether to deorbit spent satellites. (Joseph P. Loftus <JLoftus@ems.jsc.nasa.gov>, personal communication via email to Robert Forward, Monday Jun. 10, 1996 15:50:10.) In order to show that the Loftus deorbit concept was not obvious to those skilled in the art of electrodynamic tethers, Forward contacted the leading expert, Joseph Carroll, of Chula Vista, Calif., who built and participated in the flight test of the PMG. After being told of the Loftus concept in a telephone conversation, his reply in an Email message dated Aug. 5, 1996, was "such a system would be feasible . . . by it is still not obvious to me that it would be useful . . . "

Loftus was considering the use of electrodynamic drag from a conducting tether to achieve this goal of bringing the unwanted spacecraft down from its high orbit (where atmospheric drag is negligible) to a 200-km orbit, where atmospheric drag would rapidly finish off the task of removing the unwanted spacecraft from orbit. The tether Loftus was considering was a single-line, conducting tether, typically 1-mm in diameter, 1-km long, and, if made of aluminum, 2-kg in mass. He would include means at the ends of the tether to contact the ambient space plasma around the Earth to complete the current loop.

Unfortunately it is probable that space impactors would sever the 1-mm diameter, 1-km long single-line tether proposed by loftus within a 1/e lifetime of four months. This would produce orbital debris rather than removing it. The motivation for this work is the NASA Safety Standard NSS 1740.14 "(Guidelines and Assessment Procedures for Limiting Orbital Debris." The relevant portion of the Standard starts on page 6-3: General Policy Objective-Postmission Disposal of Space Structures. Item 6-1: "Disposal for final mission orbits passing through LEO: A spacecraft or upper stage with perigee altitude below 2000 km in its final orbit will be disposed of by one of three methods." The method of interest is the atmospheric reentry option, Option a: "Leave the structure in an orbit in which, using conservative projections for solar activity, atmospheric drag will limit the lifetime to no longer than 25 years after completion of mission. If drag enhancement devices are to be used to reduce the orbit lifetime, it should be demonstrated that such devices will significantly reduce the area-time product of the system or will not cause the spacecraft or large debris to fragment if a collision occurs while the system is decaying from orbit."

The NASA standard applies only to NASA spacecraft and even then only to completely new spacecraft designs. New versions of existing designs are to make a "best effort" to meet the standard, but will not be required to change their design to do so. The Department of Defense has adopted the NASA standard with the same provisos. An Interagency Group report has recommended that the NASA standard be taken as a starting point for a national standard. It is NASA's recommendation to the Interagency Group that the safety requirement be phased in only as spacefaring nations reach consensus internationally, which is being done through the International Debris Coordination Working Group whose members are Russia, China, Japan, ESA, UK, India, France, Italy, and the US.

Thus, although the NASA Safety Standard in its present form is not the "Law", the existence of the standard means that some time in the future a similar requirement may be imposed on all spacecraft. This could result in major growth in future space tether business, with a sale to every non-geostationary spacecraft being "mandated" by government safety regulations, somewhat as the sale of seat belts and airbags for every car are mandated.

In fact, three of the companies planning to set up "constellations" of low to medium orbit communications: Teledesic, Iridium and Odessey have committed their companies to abide by the spirit of NASA Safety Standard 1740.14 by using one means or another to deorbit their spacecraft before they reach end of life.

Problems with Prior Art Tethers:

All electrodynamic tether designs proposed by the prior art teach that the tether should be operated at a right angle to the magnetic field through which the tether is moving. This is a problem because the electrodynamic force acting on the tether causes the tether to align itself with the magnetic field force lines. To overcome this problem the prior art teaches the use of a large ballast mass attached to the end of the tether and/or use of a very long (tens to hundreds of kilometers) tether. The large ballast mass is expensive to take to orbit because it replaces useful payload. The long tether sweeps a larger Area-Time-Product during its useful life and thus is more likely to impact other space objects, either debris or another spacecraft.

Another problem common to all proposed prior art tethers is tether instability. If the tether produces a large electrodynamic drag force, which is desirable because a large drag force will cause the satellite to deorbit quickly, then the tether will be dynamically unstable. This instability can cause the tether to lose its effectiveness, act uncontrollably and even wrap around the satellite or otherwise malfunction. Experts skilled in the art of tether design have opined that this dynamic instability is inherently unavoidable in any electrodynamic tether system. The prior art solution, such as that presently being used in the ProSEDS experiment, has been to use a large ballast mass to increase the stabilizing gravity-gradient force and/or to limit the electrodynamic drag of the tether to less that the maximum that could be produced. In the ProSEDS experiment, the conducting electrodynamic tether is five kilometers long. To insure stability, it will be augmented by a 20–35 kilometer long non-conducting tether, which to further have stability will have a 40 kilogram ballast end mass.

Yet another problem of all proposed prior art electrodynamic tether systems is how to radiate away the energy produced by the tether's operation. A satellite moving at an orbital velocity of 18,000 miles per hour has a kinetic energy of over 10,000 calories per gram. To put this amount of energy in an understandable perspective, it may be noted that when nitroglycerine explodes it produces about 1,500 calories per gram. Prior art designs of electrodynamic drag tethers teach the use of the electrical energy generated by the tether to charge batteries or operate electronics, with the excess energy being converted into heat by a resistive load. This excess heat must be radiated to the space environment or it will melt the resistive load. Thus the resistive load, and/or its associated radiator structures, must be massive and replace useful payload.

DISCLOSURE OF THE INVENTION

The present invention comprises an electrodynamic tether structure and a method of use. The principal industrial utility of the present invention is to deorbit satellites in Earth orbit at the end of their useful life. This embodiment of the present invention is sometimes referred to in this specification as a "Terminator Tether™" because it terminates the orbital lifetime of the host spacecraft. The structure of the tether taught by the present invention is a short, wide, interconnected-multiwire (compared to the long single wires of the prior art) conductive Hoytether whose area maximizes electrodynamic drag while simultaneously minimizing the Area-Time-Product swept by the tether during its operating life. The preferred tether length is two to five kilometers. The preferred tether mass is one to five percent (1%–5%) of the spacecraft mass. The method of operation comprises orienting the tether structure at a 35.26-degree trailing angle to the local vertical to maximize electrodynamic force on the tether while avoiding tether instability and allowing use of a small tether end mass.

The present invention also teaches that the satellite-tether system may be rotated around its common center of mass to centrifugally produce tension force in the tether structure to oppose forces causing tether instability. The angle of the conductive tether structure of the present invention with respect to the velocity vector of the host spacecraft may be controlled by the method of the present invention so it interacts with the encountered magnetic field to induce a maximum current flow in the tether. This produces maximum electrodynamic drag. All or a portion of this electric power may be stored and then controllably applied to the conductive tether to produce an induced electrodynamic force. This induced electrodynamic force may by used to enhance the drag force, to rotate the tether-satellite system and/or to provide satellite propulsion, i.e. to change the state vector of the satellite for any useful purpose, e.g. to avoid collision or to change the host spacecraft's orbit to an orbit more favorable for more rapid deorbiting.

The present invention also teaches a tether structure that also functions as a thermal radiator and/or plasma contactor. An embodiment of the present invention using conducting elements of the satellite, e.g. the solar arrays, as electrodynamic tether structures is also disclosed.

BRIEF DESCRIPTION OF THE DRAWINGS

The present invention may be better understood with reference to the following drawings:

FIG. 1b is a graph showing the level of electrodynamic thrust for a 10 kilometer, 10 kilowatt tether at various altitudes and inclinations.

FIG. 2d shows the Hoytape structure used by the preferred embodiment of the present invention.

DETAILED DESCRIPTION OF THE PREFERRED EMBODIMENT

The principal industrial utility of the present invention is the deorbiting of satellites in Earth orbit, which necessarily can happen only in outer space. Until the present invention is reduced to actual practice by use with satellites in outer space and a body of practical experience is thereby obtained, the present invention can only be constructively reduced to practice, such as by this written specification and its associated drawings, diagrams and graphs and by reference to electric measurements made on conducting tethers in space by the PMG and TSS experiments. The inventors provide herein a detailed discussion of the theory of the present invention to help those skilled in the art of aerospace and tether engineering to understand the present invention and to make and use the best embodiment of the present invention known to the inventors at the time this specification was prepared, without undue experimentation.

Although the present invention is discussed in this specification in its preferred embodiment as a means of deorbiting satellites, it must be emphasized that discussion of this specific use in no way limits the broad scope of the present invention. The present invention can be used to change the direction and speed, i.e. the state vector, of any space object providing that object is in motion relative to any magnetic field. This magnetic field may be that of the Earth or of any other celestial body, for example Jupiter or the sun.

In this specification the material forming the structure of the electrodynamic tether is specified as being a conductor. For example, a metal, such as copper or aluminum wire could be used. Likewise, nonmetallic conductor, such as carbon nanotubes, or a conductive polymer could form the conductive structure of the tether.

Figure 1A:
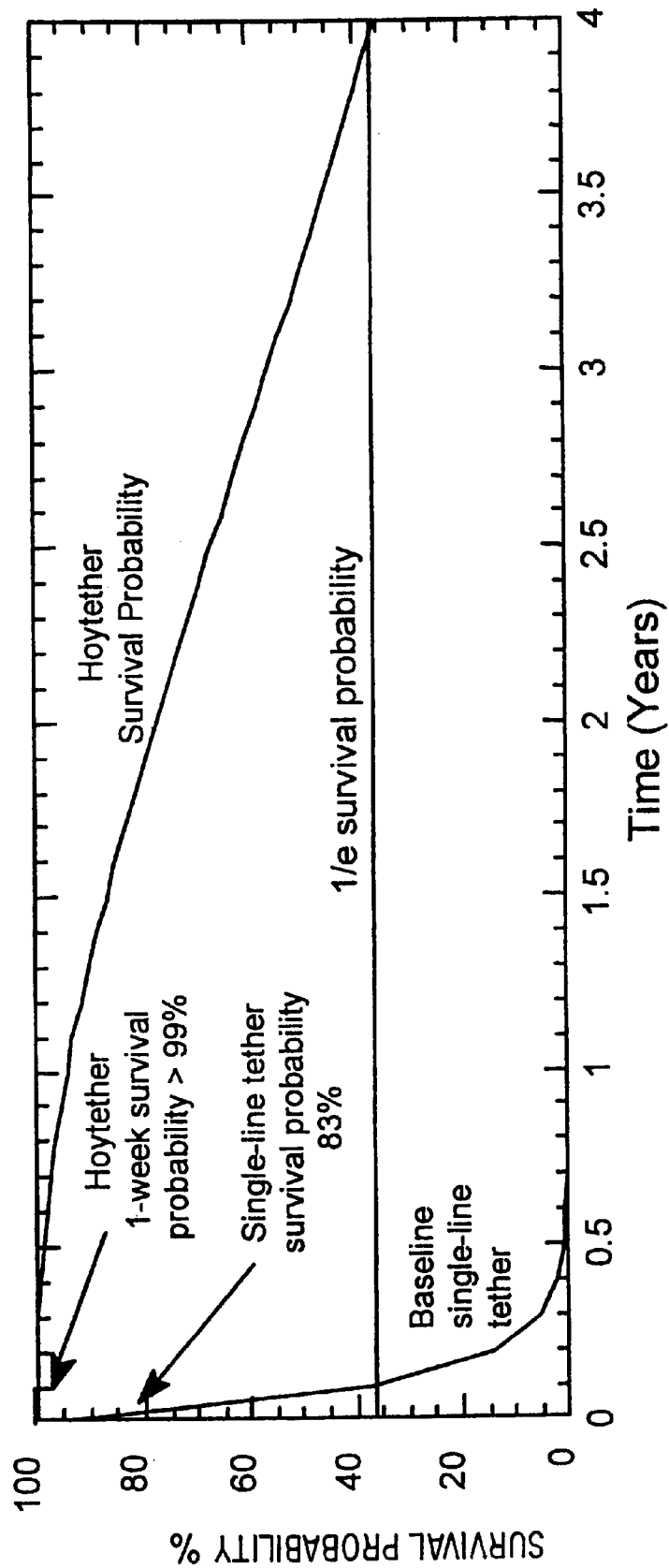
FIG. 1a is a graph comparing the survival probability of a single line tether as taught by the prior art to the Hoytether used by the present invention.

FIG. 1a shows the survival curve for a Hoytether as used by the present invention vs. the survival curve of a prior art single line tether. The survival probability curve of the Hoytether as a function of time does not conform to the well known "1/e decay" shape of a single-line tether. The Hoytether can maintain a high level of survival probability, about 99 percent, until it nears its 'lifetime'. Its survival probability then drops rapidly to zero. A detailed mathematical analysis of the difference between Hoytether and single tether survival probabilities is given in Appendix E "Small Impactor Survival Probabilities of Hoytethers" and Appendix F "Large Orbital Debris Survival Probabilities of Hoytethers", both contained in the Final Report of NASA Contract NAS8-40545. The resulting cut probability with time for the Hoytether has a "bingo curve" shapes. In a bingo game, at least five numbers must be called before anyone can win, and usually many numbers have to be called before one of the bingo cards gets five in a row. In the Hoytether at least four cuts must happen at the same level before any failure occurs, and many cuts have to be made before any one of the levels has all four lines cut. The bingo curve has the property that the probability of survival stays very high for periods short compared to the lifetime. The probability of survival is greater than 99% for periods shorter than 10% of the lifetime. This is much better performance than the 1/e curve of a single line tether, where the probability of survival is only 90% at 10% of the 1/e lifetime.

FIG. 1b shows the calculated level of electrodynamic thrust, in Newtons, produced by a ten kilowatt, ten kilometer single conductor tether at altitudes between 200 and 1400 kilometers and at orbital inclinations between zero degrees and eighty degrees.

Figure 1C:
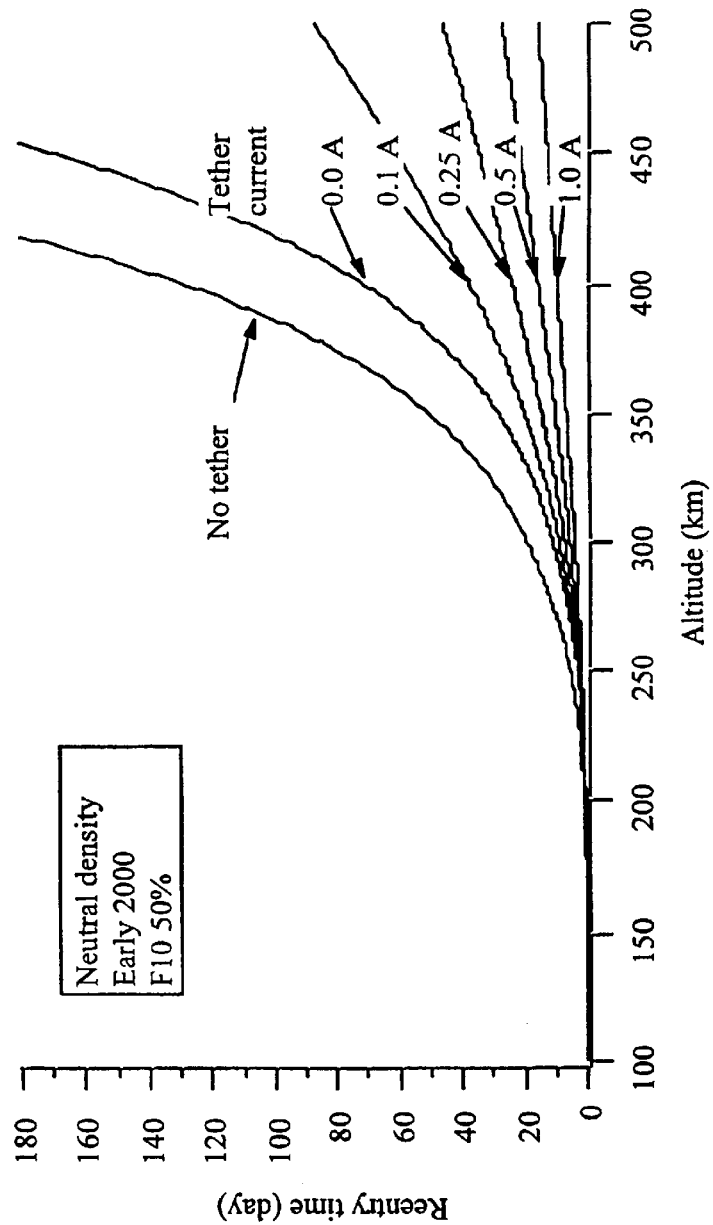
FIG. 1c is a graph showing reentry time sensitivity of a five kilometer ProSEDS tether for several conditions of current flow in the electrodynamic tether.

FIG. 1c is a graph showing the reentry time sensitivity calculated for a five kilometer ProSEDS single conductor tether at altitudes between 200 and 500 kilometers with current flow in the tether between on flow and one ampere.

FIGS. 1b and 1c are the work of Enrico Lorenzini of the Smithsonian Astrophysical Observatory from his study "Performance Evaluation of the Electrodynamic Tether Tug", NASA/MSFC Grant NAG8-1303 (Nov. 12, 1966). They show that experts in the field believe that the present invention will have industrial utility, as the current flow of one ampere in FIG. 1c decreases the deorbit time for the calculated case from more than 180 days to less than 20 days.

Figure 2C:
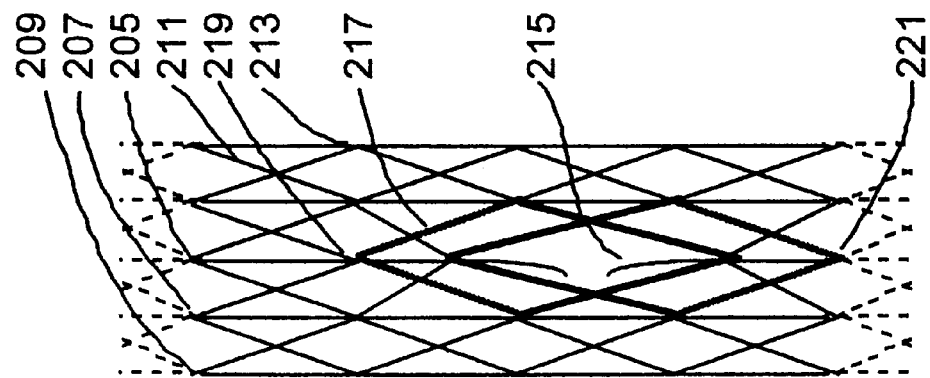
FIGS. 2a, 2b and 2c show the Hoytether structure used by the preferred embodiment of the present invention.
Figure 2B:
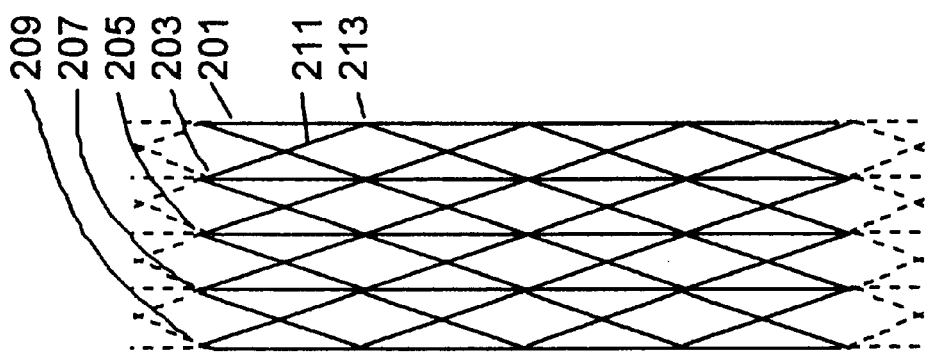
Figure 2A:
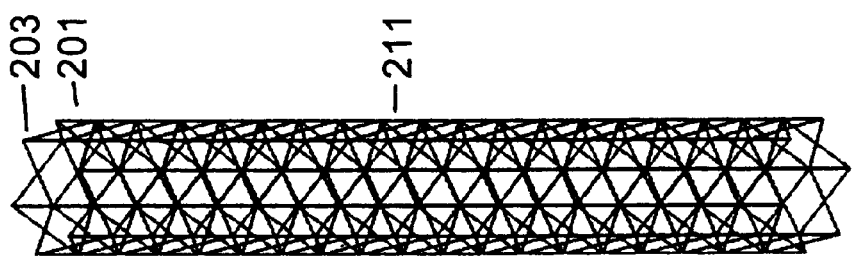

FIG. 2a is an isometric drawing showing the generally cylindrical structure of the Hoytether. In FIG. 2a, primary lines 201 and 203 are shown connected via secondary lines 211. In FIG. 2b, which is a schematic illustration of the structure shown in FIG. 2a, primary lines 201, 203, 205, 207 and 209 are connected, each to their respective adjacent primary lines, by a plurality of secondary lines 221. These connections, for example as shown at interconnection 213, are made by knotless, slipless interconnections, such as Soutache braiding of twisted connections.

FIG. 2c shows the Hoytether structure of FIG. 2b but with a severed primary line 205 at breakpoint 215. The second level of secondary lines 217, shown as bold lines in FIG. 2c, redistribute the load from the severed primary line 215 at point 217 back to line 215 at points 219 and 221, above and below the break, respectively.

For the electrodynamic tether, a preferred embodiment would be to unroll the tubular Hoytetherr™ into a flat Hoytape™ as shown in FIG. 2d.

Figure 3:
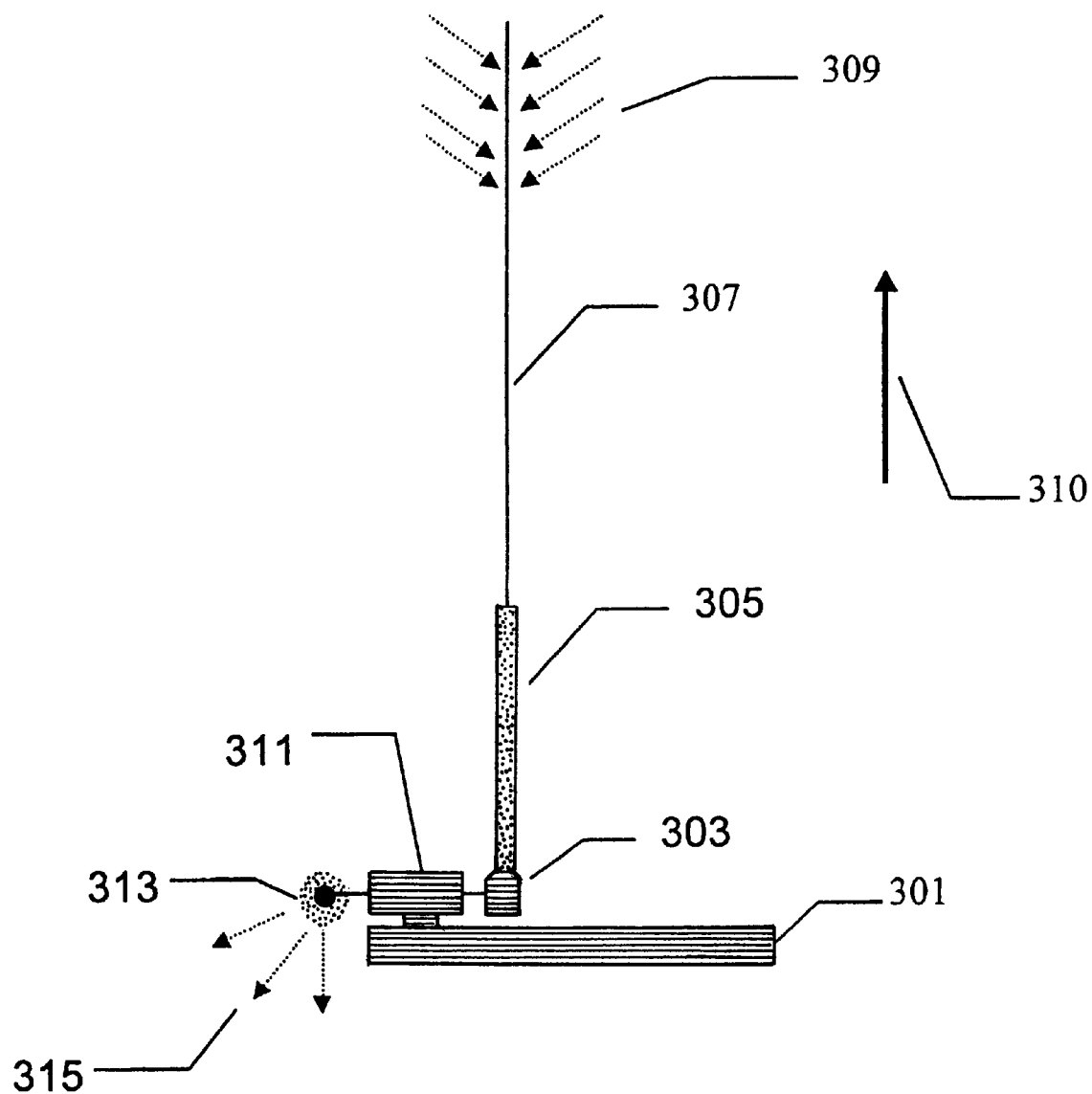
FIG. 3 is a block electrical diagram of an electrodynamic tether system.

FIG. 3 generally shows the arrangement of functional elements of an electrodynamic tether system. Of course such a system must have a means of attachment to the spacecraft, a deployer, the tether itself, some form of space plasma cathode contactor, some form of space plasma anode contactor, a power dissipation system, and a communication and control system. Each of these individual elements are known in some form to those skilled in the art of aerospace engineering. Thus the present inventors do not feel it is necessary to describe them in detail in this specification.

In FIG. 3, a space object 301, i.e. a satellite in Earth orbit, or any other space object either natural or man made, is physically connected to the tether system. The tether system comprises a deployer 303 from which a conductive Hoytether 305 having a bare segment 307 extends upward from space object 301. The positively biased anode end 309 of tether 305 collects electrons from the ionosphere as space object 301 moves in direction 310 across the Earth's magnetic field. These electrons flow through the conductive structure of the Hoytether to the power system interface 311, where it supplies power to an associated load, not shown. The electrons then flow to the negatively biased cathode 313 where electrons are ejected into the space plasma 315, thus completing the electric circuit.

In order to allow those skilled in the art to better appreciate the broad scope of the present invention, the inventors will now provide an example using specific tether and system values to compare the Terminator Tether™ to prior art means, ie a rocket, for deorbiting a satellite.

Terminator Tethers™:

When an Earth orbiting conducting space tether moves through the magnetic field of the Earth, an electric field is generated in the tether that is proportional to the velocity of the conductor, the magnetic field strength of the Earth, and the angle between the conducting tether and the magnetic field lines. From data obtained during the various electrodynamic experiments that have been conducted in space to date, such as the PMG, TSS-1, and TSS-1R experiments, a typical value of the generated emf per unit length of tether of E=100–200 Volts/kilometer can be assumed. The electric potential V developed at the ends of a tether of length L is then V=EL. For a tether of length L=10 km, the electric potential developed is V=1000 V. For calibration, the 20-km long TSS-1R tether, at the moment of failure, was developing a potential of 3500 volts, which is 175 volts/km.

The mass of a conducting tether of length L, cross-sectional area A, and densin, d is given by m=dLA. Typical values for the density are d=2700 kg per cubic meter for aluminum and 8900-kg per cubic meter for copper. For a typical aluminum tether of mass m=10 kg and length L=10 km, the cross-sectional area will be A=0.37 mm squared. If this were a solid-wire single-line tether, the diameter of the wire would be D=0.69 mm (21.5 gauge). If this were an 18 line tubular Hoytether, the diameter of the lines in the Hoytether would be D=0.16 mm (34 gauge).

The resistance of a conducting tether of length L and cross-sectional area A is given by R=rL/A, where r is the resistivity of the conductor in nano-ohm-meters (nΩ-m). Typical values for the resistivity are r=27.4nΩ-m for aluminum and 17.0 -nΩ-m for copper. For the m=10 kg aluminum tether of length L=10 km and cross-sectional area A=0.37 mm squared at 20 degrees C, the end-to-end resistance is 750 Ω. This value of resistance is the essentially the same whether the conductor area is concentrated into a single-line tether or divided up into many lines as in a multiline Hoytether.

The current I generated in the conducting tether by the electric potential V between the ends of the tether applied across the tether resistance R is I=V/R. For the 10 kg mass aluminum tether of length L=10 km, electric potential V=EL=1000 volts, and resistance R=750 Ω the current is I=V/R=1.33 Amps. Currents near these values were measured in the TSS-1R experiment at the time of failure. At the time of failure of the TSS-1R tether, none of the plasma contactors on the Space Shuttle or the Italian Satellite were operating. Thus the current was being collected by the conductive surface area of the Space Shuttle and the Italian Satellite at the two ends of the tether. The Space Shuttle area is quite large, so it was not the limiting factor in current collection. The diameter of the Italian Satellite was 1.6 m, which would give it an effective plasma contact area of about 8 square meters. This shows that, if the plasma contact area of the ends of a conductive space tether can be make large enough, then ampere level currents can be extracted from the ambient space plasma without the use of space plasma contactors.

The power dissipated as ohmic heating in the tether is given by P=IE. For an aluminum tether of mass m=10 kg, resistivity r=27 nΩ-m, and density d=2700 kg/cubic meter, subjected to an electric field of E=100 V/m, the power dissipated in the ohmic losses of the conductor is P=IV= 1330 Watts. For a 1 kg mass tether, it would be still a considerable 133 Watts of dissipation.

There will no doubt be additional dissipation of energy in plasma ohmic losses, plasma wave generation, and plasma ion acceleration, but the ohmic losses in the conducting tether alone are sufficient for the task of deorbiting an unwanted spacecraft massing 100 to 1000 times more than the tether.

The decay time of a metric ton spacecraft moving from a 1000 km altitude orbit to a 200 km altitude orbit with an energy difference of dU=3.3GJ, when its energy is being dissipated at a power of P=1330 W by an aluminum tether massing just 10 kg, or 1% the mass of the spacecraft, is about one month. This is a remarkably short time, and indicates that the concept of using a conductive tether to deorbit a spacecraft is indeed feasible. If the aluminum tether massed only 1 kg, or 1/1000th the mass of the spacecraft it was deorbiting, then the decay time would rise to 10 months, still a reasonable value.

In reality, of course, the actual decay time will be longer than this. If the electrodynamic drag force is very large, and becomes larger than the gravity gradient forces pulling on the ends of the tether (which force is proportional to the mass of the tether), then the tether will tend to align itself along the magnetic field lines instead of across them, and the drag force will decrease because of the small angle between the conductor length and the magnetic field lines. The tether will then settle into an angle determined by the balance between these two forces.

Is the Terminator Tether™ theoretically a better means than atmospheric drag or a rocket engine for deorbiting satellites at the end of their useful life?

In the formula for da/dt (change in altitude per change in time), using the assumptions of near-circular spiral trajectories, the Area-Time-Product (Z), the criteria by which NASA judges compliance with Safety Standard 1740.14, is given by:

$$Z = A \int dt = -\frac{m}{C_D} \int \frac{da}{\rho(a)\sqrt{\mu a}},$$

where ρ(a) is simply the density as a function of semi-major axis. Thus, for a static atmosphere, the problem of area-time product is reduced to quadrature. Note that the area-time product depends only on the density profile and the ratio of spacecraft mass to drag-coefficient and is linearly related to that ratio.

The basic altitude-dependence of the atmospheric density, represented here by ρ(a) can be expressed in a low-order power series of ln(density)=f(ln(altitude)), so that it will be possible to develop a representation of the log—log relationship between altitude and density. The three static levels of atmospheric density are modeled as 5th order polynomials in the natural log of the altitude and are representative of well known atmosphere models, for example, Jacchia, L. G., "Thermospheric Temperature, Density, and Composition: New Model," SAO Special Report 375, March 1977. 2. Anon., Marshall Space Flight Center, "Long-Range Statistical Solar Activity Estimation," Atmospheric Sciences Division, 1989.) The values of exospheric temperature are reasonable (about 2-sigma) high and low solar activity values of 1400 and 800 kelvins respectively. The mean value is taken to be 1100 kevins.

Figure 4:
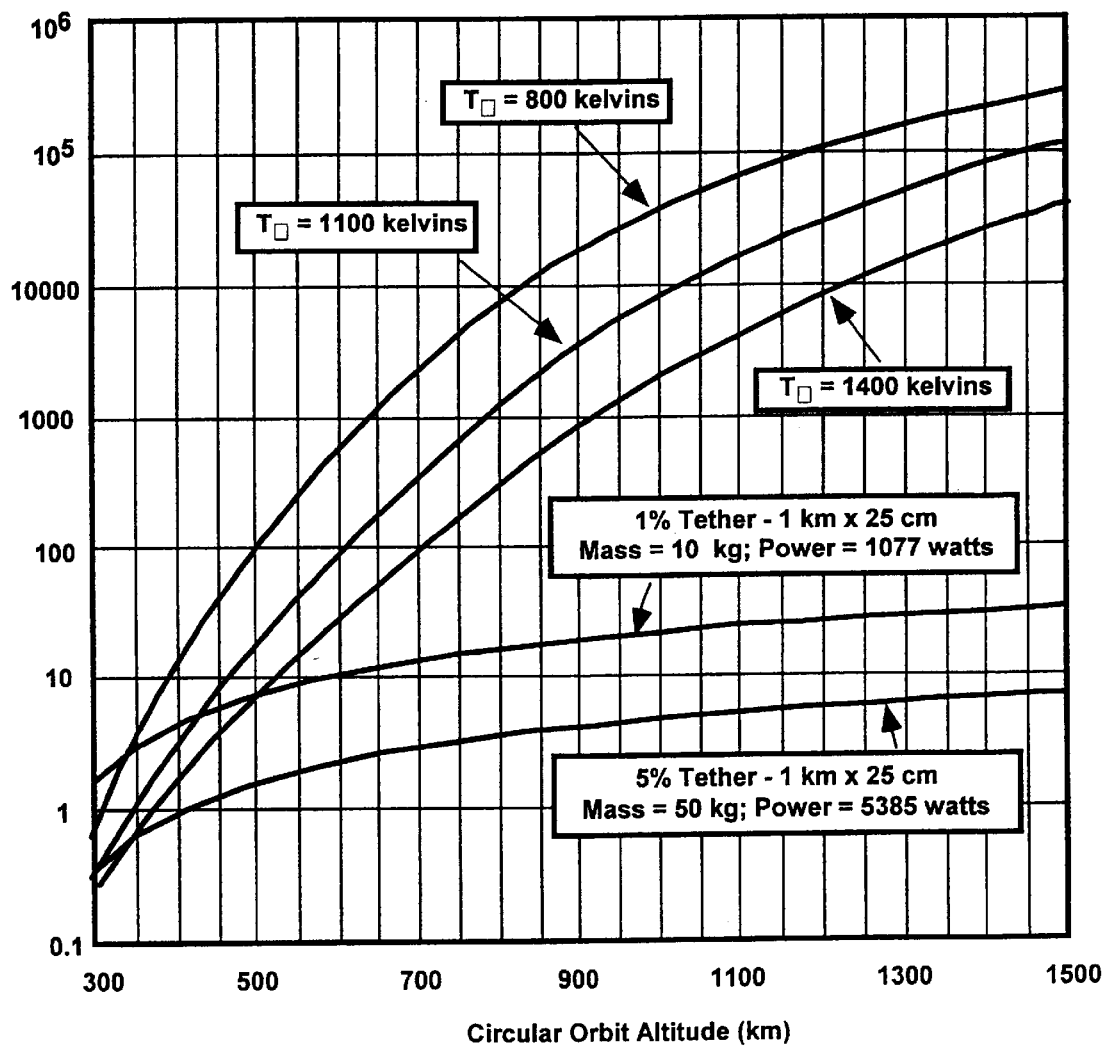
FIG. 4 is a graph showing a graph of the Area-Time product for three separate levels of exospheric temperature (for neutral drag calculations) and for two separate assumptions regarding tether mass and power drawn from the ambient plasma (for the Terminator Tether™ calculations).

FIG. 4 shows a graph of the Area-Time product for three separate levels of exospheric temperature (for neutral drag calculations) and for two separate assumptions regarding tether mass and power drawn from the ambient plasma (for the Terminator Tether™ calculations). The density profiles for the three values of exospheric temperature represent the extremes and mean values to be expected during the next several decades. The exospheric temperature goes through a cycle of about an 11 year period with maximum about 1400 kelvins and minimum about 800 kelvins.

The tether calculations include an inherent assumption that the Terminator Tether™ transfers all the energy extracted from the ambient space plasma into drag that decreases the orbital energy of the spacecraft at a rate given by the power drawn by the tether. Thus, the change in energy for a spacecraft of mass m at an initial altitude h is given by the expression:

$$\Delta E = -m\left\{\frac{\mu}{2(R_e + h)} - \frac{\mu}{2(R_e + 250)}\right\},$$

and the time required to effect this change in energy of the mass, m, is just $$\Delta t = \Delta E/P,$$

where P is the power drawn by the tether from the ambient plasma charge.

The curves for 1% and 5% tethers do not include the effects of atmospheric drag because the electrodynamic drag is orders of magnitude greater than the neutral atmospheric drag. At altitudes greater than about 700 km, the electrodynamic drag is 200 to 3000 times greater than the neutral drag forces.

It is clear, from FIG. 4 that the Terminator Tether™ concept is far superior to neutral drag in removing spacecraft from orbit, no matter how much additional area is added to the passive spacecraft to increase the atmospheric drag. The analyst should note that FIG. 4 is proportional to mass; that is, the Area-Time-Product values should be multiplied by the mass of the spacecraft and divided by 1000 kg. This is true for the neutral drag and Terminator Tether™ curves alike. The power levels assumed for the 1% and 5% tethers are only 80% of their theoretical values. This is done to provide a 20% margin on the power available from the ambient plasma and electrodynamic gradient.

Conventional rocket mechanisms can remove spacecraft from orbit, but this mechanism is apparently not viable from mass considerations when these factors are compared with the capabilities of the Terminator Tether™. A satellite owner may decide to satisfy the NASA safety requirements by adding a small solid motor and the associated hardware, software, sensors and structure to make the package independent, to be used to deorbit the spacecraft in case the main spacecraft power, attitude, or propulsion system fails.

The requirements of such a rocket motor system are more stringent than those attributed to ordinary spacecraft. The rocket motor deorbit system must operate when some or all other systems of the spacecraft have failed. These more stringent requirements are balanced by lesser requirements of performance. The backup system must simply deorbit the spacecraft; it does not have to perform all the other duties of the spacecraft. But the backup system must know when to fire under all kinds of anomalous situations, including tumbling, offset of center of mass (because of loss of parts due to collisions), and lack of knowledge of the orbital position.

Figure 5:
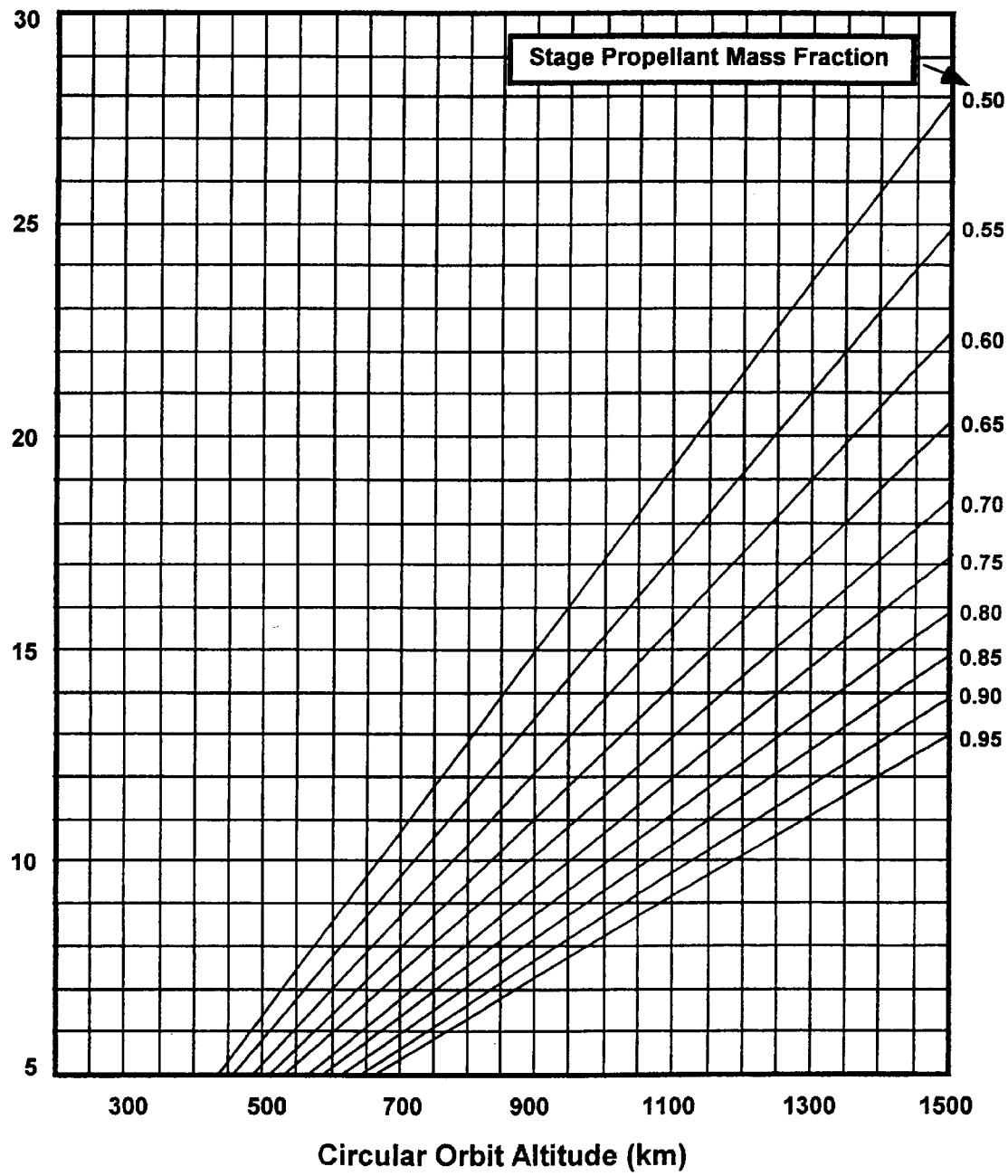
FIG. 5 is the percent additional mass required in orbit to drop the perigee of a circular orbit at altitude, at, to a value of 200 kilometers using standard chemical rocket as taught by the prior art for deorbiting unwanted spacecraft.

FIG. 5 shows the percent additional mass required by the rocket motor system to drop the perigee of a circular orbit at some initial perigee altitude to a value of 200 km. The atmospheric drag at this 200 km perigee altitude will remove any spacecraft (in the range considered) from orbit in a few revolutions. The contours of constant stage propellant mass fraction, $\lambda$, range from low values of 0.5 through reasonable values of 0.65 to 0.7, up to the values associated with the best solid motors ($\lambda \nabla 0.93$) without adding any extra hardware to the emergency stage. An effective, independent stage to provide a retro deltaV of from 50 to 325 m/s will almost certainly have a $\lambda$ of the order of 0.6 to 0.75. If the emergency stage is required to perform its own attitude determination, the stage propellant mass fraction may be as low as 0.55 or 0.50. Note that the additional mass, shown in FIG. 5, must also be lofted to orbit in the first place, to provide the mass on orbit for the originally intended service. The stage propellant mass fraction, $\lambda$, is a key stage performance parameter that describes the ratio of the mass of propellant to the mass of the stage. That is $\lambda=m_p/(m_p+m_t)$, where $m_p$ is the mass of the propellant and $m_t$ is the mass of everything else in the stage (not including the payload or any stages above or below the stage being considered). Typical independent small rocket stages have values of $\lambda$ from 0.60 to 0.75. The curves of stage propellant mass fraction are shown as straight lines (a minor approximation) and are included only from 0.5 to 0.95, the extremes of reasonable design practice.

These calculations that show, beyond any reasonable doubt, that the Terminator Tether™ concept is far superior to conventional mechanisms such as drag enhancement devices or small rocket deorbit propulsion systems. The superiority is measured in terms of Area-Time-Product, NASA's measure of the likelihood of collision with other spacecraft in the path of the descending spent member of a constellation. Tether calculations were made using conservative assumptions that the power extractable from the ambient plasma and electrodynamic gradient is only 80% of the theoretical power available to a perfect tether crossing the magnetic field lines at a right angle, i.e. normally.

The following analysis is presented by the inventors to help those skilled in the art to better understand the present invention when it is used as a Terminator Tether™ for removing from orbit unwanted non-geostationary Earth-orbiting spacecraft at the end their useful lives. The primary result of that analysis is that the electrical power P in the tether that is converted into heat by the resistance of the tether and radiated away into space will remove energy from the spacecraft, causing it to rapidly deorbit, thus reducing the amount of orbital space debris that must be coped with in outer space. Tether electric power P is given by:

$$P=(vB)^2m/2rd$$

where m is the mass of the conducting tether, r and d are the resistivity and density of the conducting material, and v is the velocity of the spacecraft's motion through the Earth's magnetic field B. For a m=10 kg tether of aluminum with resistivity of r=27.4 n$\Omega$-m and density d=2700 kg/m$^3$, moving at a velocity v=7037 m/s relative to the Earth's horizontal magnetic field B=26.5 $\mu$T, the power dissipated is P=2350 W! This energy loss in the form of heat must necessarily come out of the kinetic energy of the host spacecraft. For a typical example, a 1000 kg spacecraft in a 1000 km high orbit subjected to an energy loss of 2350 J/s from a 10 kg tether (1% the mass of the host spacecraft) will be deorbited in a few weeks.

Power levels of the magnitude estimated in the previous paragraph have been measured in a real orbital space experiment, the TSS-1R mission carried out on the Shuttle Orbiter in 1995. In that experiment, a large Italian spacecraft, 1.6 m in diameter, was deployed upward from the Shuttle Orbiter at the end of a conducting copper wire tether covered with electrical insulation. As the tether was slowly deployed upwards, a series of measurements were made of the open circuit voltage induced in the tether by its motion through the Earth's magnetic field. The voltage between the end of the tether and the Orbiter ground varied from zero volts at the start to 3500 V when the amount of tether deployed approached its maximum length of 20 km. Periodically, the end of the tether was connected either to one of two different electron guns, which supplied contact to the surrounding space plasma, or to the Orbiter ground. The bare surfaces of the Shuttle Orbiter proved to be a surprisingly good plasma contactor via a combination of ton collection and secondary electron emission. The current flow through the tether was deliberately limited by control circuits and the current capacity of the electron guns to about 0.5 amperes, but power levels of 1800 Watts were reached.

The tether was intended to have a fully deployed length of 20 km, but at a deployed length of 19.5 km, when about 3500 V was being induced at the end of the tether inside the Orbiter reel mechanism, a flaw in the insulation allowed an electrical spark to jump in an uncontrolled manner from the tether to the Orbiter ground. With no control circuits to keep the current level down to 0.5 amperes, the current flow jumped to 1.1 amperes, and the total power generated was P=3850 Watts Most of this energy went into the electrical arc, which burned through the tether, causing it to break and halting the experiment. This experiment showed that large areas of bare conducting material, such as that provided by the 8 square meter area of the Italian spacecraft at one end of the tether and the very large surface area of the Shuttle Orbiter spacecraft at the other end of the tether, can collect and emit amperes of current, while thousands of volts of potential can be generated by sufficiently long tethers moving at orbital speeds.

Thus, both theory and experimental data collected in the space environment indicate that significant amounts of electrodynamic drag force can be obtained from a low mass conducting tether attached to a host spacecraft, provided the ends of the conductor can exchange sufficient numbers of electrons with the surrounding space plasma.

Experimental data from the TSS-1R data also produced the amazing result that the efficiency of a bare metal surface in "contacting" the space plasma is many times better than the standard theory would predict. The 8 square meters of bare surface area of the Italian spacecraft were sufficient to collect the 1.1 A of electron current. This amount of area is easily replicated by a few hundred meters of bare wire, considering that the effective collection diameter around the wire is the Debye length, which is a few centimeters at the typical values for space plasma density and temperature.

Because of this result, that a bare wire can easily collect electrons, Les Johnson, Nobie Stone, Chris Rupp, and others at NASA Marshall Space Flight Center have formed a team, which includes the present inventors, which is embarked on a new flight experiment. The experiment is scheduled for a piggy-back flight on a Delta II launch of an AF Global Positioning Satellite in early 2000. The goal of the experiment is to demonstrate that electrodynamic drag from a wire moving at orbital speeds through the Earth's magnetic field will create a large enough electrodynamic drag force to deorbit the Delta II second stage, whose mass is greater than 1000 kilograms, in a few weeks. This is essentially a demonstration of the Loftus electrodynamic drag deorbit concept and the first step in the development of a Terminator Tether™.

The ProSEDS (Propulsion Small Expendable-tether Deployer System) mission will use a 5 km long copper wire conductive tether massing 18 kg connected to a 20–35 km long nonconducting tether, which is in turn connected to a 25–40 kg ballast mass. The total of 25–40 km of tether length and the 25–40 kg ballast mass on the end will provide enough gravity gradient force to keep the tether aligned near the zenith, so that the direction of the current in the tether is at right angles to both the direction of the spacecraft motion in the nominal EW direction and the Earth's near-equatorial magnetic field in the nominal NS direction.

An important feature of the ProSEDS experiment is that it is designed to be completely self-powered. It uses a battery to initiate deployment and to power up the plasma contactor, but once current is flowing through the tether, some of the power is tapped off and used to recharge the battery. The battery, in turn, powers the current control electronics, the telemetry, system, and the plasma contactor. The ProSEDS mission will not be designed to allow ground control changes in operation, primarily because of the increase in complexity and cost associated with that option.

The present invention is the use of a small, low-mass deployer/controller package containing a large collecting area, short length, multiline space tether, such as a Hoytape mesh made of aluminum wire, as a "Terminator Tether™" for a constellation spacecraft. The Terminator Tether™ would be deployed when the host spacecraft is no longer working or no longer wanted. The electrodynamic drag from the Terminator Tether™ would rapidly remove the unwanted spacecraft from the constellation and a few weeks later complete the deorbit of the host spacecraft from space by burnup in the upper atmosphere of the Earth. For a Terminator Tether™ to be of maximum usefulness for constellation spacecraft, it would be desirable to minmize the mass and the length of the tether. A lower added mass means more mass for revenue producing transponders, while a shorter tether length means a lower collision cross-section Area-Time Product during deorbit.

Figure 6:
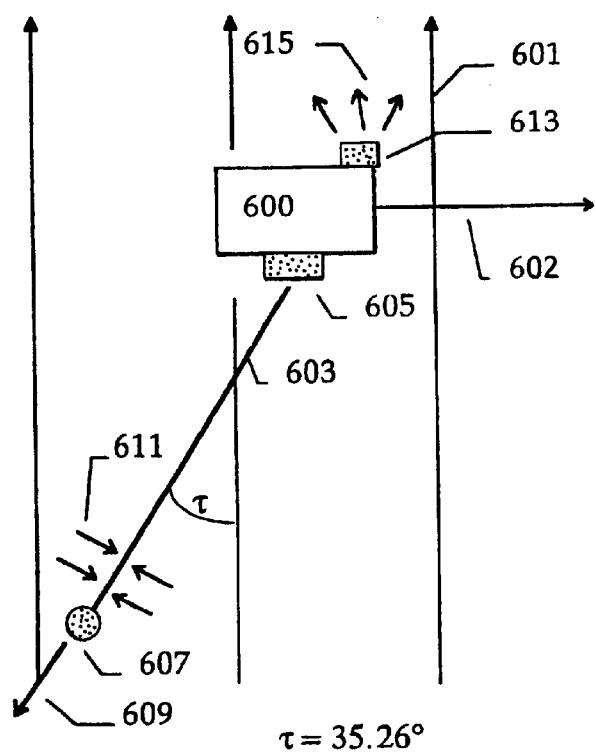
FIG. 6 is a deorbit tether system shown operating with its electrodynamic tether at a trailing 35.26-degree angle to the encountered magnetic field, as is taught by the preferred embodiment of the present invention.

FIG. 6 shows a spacecraft 600 having a state vector 602 that causes the spacecraft to move across magnetic field lines 601. Spacecraft 600 has a conductive tether 603 attached to it by tether deployer and control system 605. The outer end of tether 603 is attached to tether end mass 607. Spacecraft 600 also has an attached electron emitter means 613.

In FIG. 6, spacecraft 600 has a velocity and direction defined by state vector 602. As spacecraft 600 moves it causes conductive tether 603 to cut magnetic field lines 601. As this happens the distal end of the conductive tether collects electrons, shown as arrows 611, from the space plasma. Electrons 611 move through the conductive tether 603, are passed through a resistive load, not shown, in control system 605, and are emitted back into the space plasma as electrons 615 from electron emitter 613. This produces an electrodynamic drag in the direction shown by arrow 609.

As is discussed in detail in the electrodynamic drag analysis below, especially in that sections of the analysis titled "Optimization of Tether Angle", the maximum electrodynamic drag of the tether is achieved when the angle, shown as the Greek letter $\tau$ in FIG. 6, is 35.26 degrees, trailing, to the direction of the magnetic field lines. This angle may be maintained by a feedback control circuit that maximizes the electrodynamic drag of the tether system, as is discussed in detail below. The tether structure 603 is a Hoytether having a length of about 2 to 5 kilometers. The use of the 35.26 degree angle to the magnetic field reduces the tether instability, allowing the use of a short tether which will have a small Area-Time-Product. This will minmize the possibility that the tether will impact another space object during its use.

Figure 7:
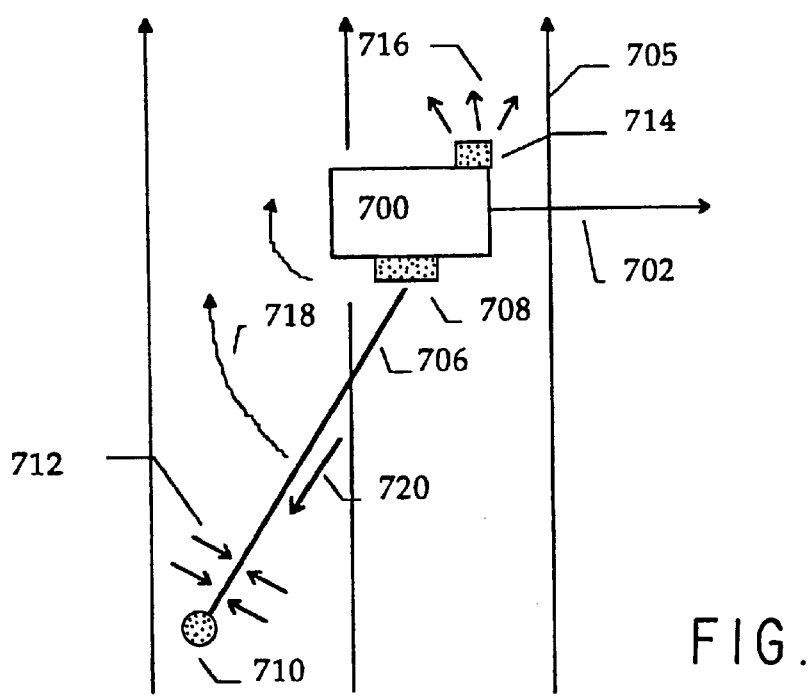
FIG. 7 shows an embodiment of the present invention in which the electrodynamic tether—satellite system is rotated about its center of mass to avoid tether instability.

In FIG. 7, spacecraft 700 has a state vector 702 across magnetic field lines 704. Conductive tether 706 is attached to spacecraft 700 by tether deployer and control system 708. The distal end of tether 706 is attached to a tether end mass 710. Spacecraft 700 has an electron emitter means 714.

Functionally, electrons 712 flow from the space plasma into conductive tether 706, are passed through a resistive load in control unit 708 and are emitted into the space plasma by electron emitter 714 as free electrons 716. As is discussed in detail in the analysis below, this produces an electrodynamic drag on satellite 700, which causes it to deorbit.

In FIG. 7, spacecraft 700 is rotating with an angular velocity indicated by arrow 718. This rotation causes a centrifugal force 720 to place tension on conductive tether 706. This force 720 places tension on the tether 706 in a direction that counters tether instability. The Tether 706 may be at any angle to the magnetic field while the rotation of the tether-satellite system is producing this useful tension. FIG. 7 shows the angle to be 35.26 degrees, which is optimum, but any angle will work.

Figure 8:
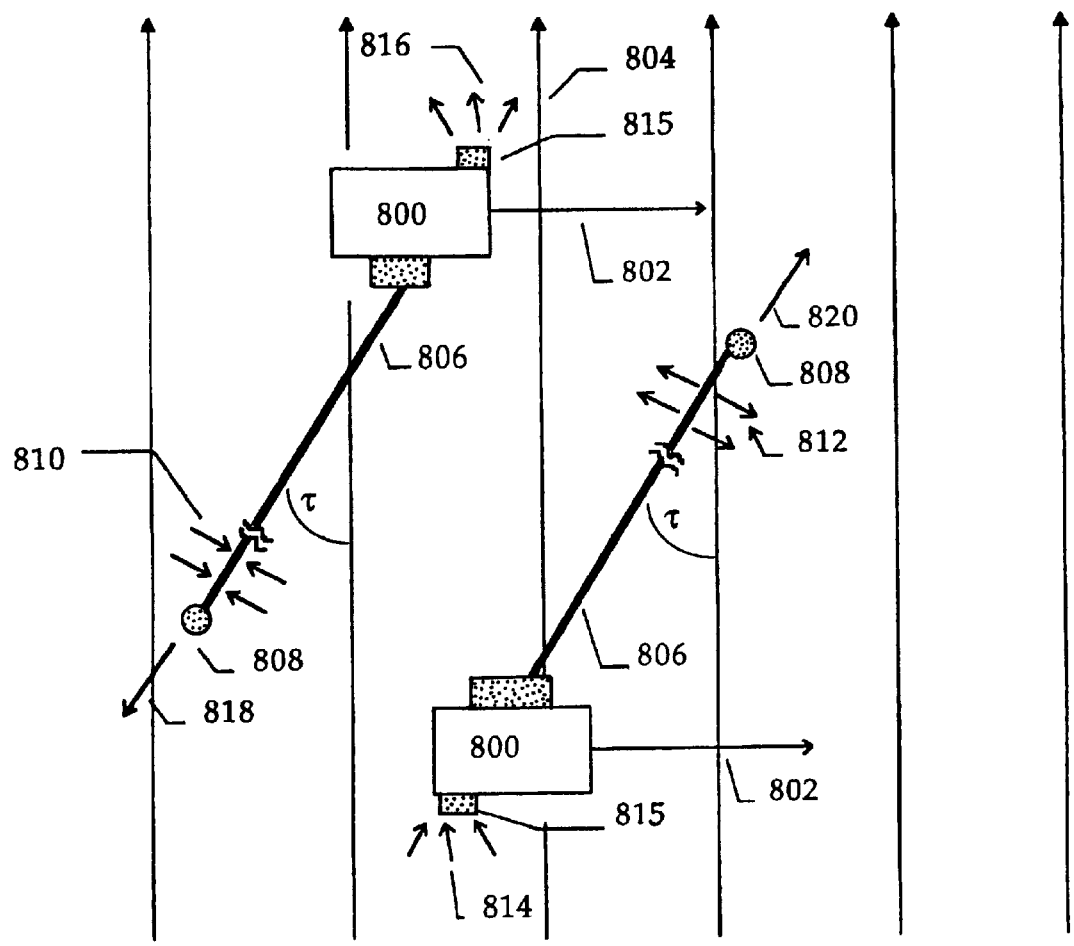
FIG. 8 shows an embodiment of the present invention wherein the tether is powered to provide induced electrodynamic force.

FIGS. 8a and 8b show a powered Terminator Tether™. In FIG. 8a the spacecraft 800 has a state vector 802 that causes it and its associated conductive tether 806 to move across magnetic field 804. Tether 806 has an end mass 808 that is proximate a plasma contactor 810. Just as was discussed in the embodiment of the present invention shown in FIG. 6 and FIG. 7, an electric current moves through the circuit formed by the space plasma, the plasma contactor 810, the conductive tether 806, and the electron emitter 815, thence back into the space plasma as electrons 816. This creates an electrodynamic drag on the tether in the direction shown by arrow 818.

In FIG. 8b, similar numbers indicate similar structures. In FIG. 8b, however, an electric power source, not shown, in spacecraft 800 provides electrons to conductive tether 806. The electrons are emitted from the end 812 of the tether 806. Electrons are collected to from the space plasma 814 by contactor 815, thus completing the electric circuit. The result is an electrodynamic force on tether 806, and therefore on spacecraft 800, in the direction show by arrow 820.

Spacecraft 800 in FIG. 8b may be rotated as is taught in the embodiment of the invention shown in FIG. 7, above, to allow the control system to time the application of electric current to the tether 806 to cause force 820 to be exert force in any desired direction along the circle made by the rotating tether. This allows the state vector of the spacecraft to be modified to raise or lower the spacecraft's orbital altitude, or to otherwise usefully change its orbital elements.

Figure 9:
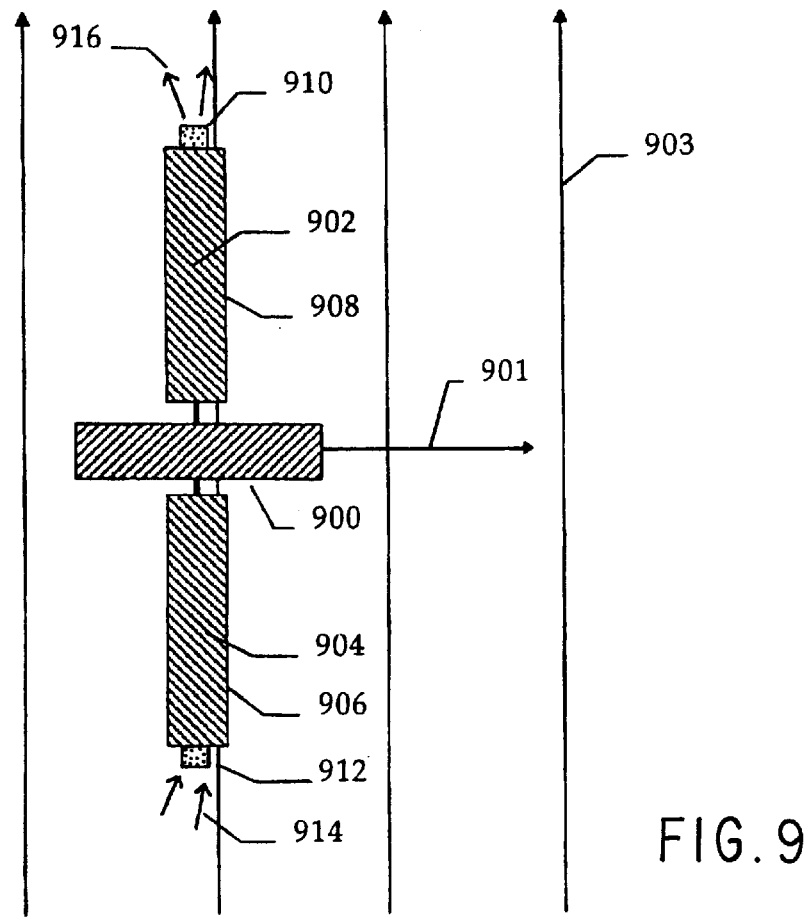
FIG. 9 shows an embodiment of the present invention wherein the solar power system structure of the satellite is used as an electrodynamic tether.

FIG. 9 show an embodiment of the present invention wherein the conductive structure of a satellite is used as the tether. In FIG. 9, a spacecraft 900 which has a state vector 901 and is moving across magnetic field 903, has two attached solar panels, 902 and 904. Solar panels 902 and 904 have conductive aluminum frames 908 and 906, respectively. Frame 906 is electrically and mechanically connected to plasma contactor 912. Frame 908 is electrically and mechanically connected to electron emitter 910. As spacecraft 900 moves across magnetic field 903, electrons from the space plasma 914 flow through contactor 912 and frame 906 to the body of spacecraft 900, where the current flows through a resistive load, not shown, and then into frame 908 and electron emitter 910 to the space plasma 916, thus completing the circuit. This creates an electrodynamic drag on spacecraft 900. If the power output from solar panels 902 and 904 was directed to flow into the frames, 906 and 908, then the electrodynamic interaction with the space plasma would cause a useful force to be impressed on spacecraft 900, as was discussed in connection with FIG. 8 above. The spacecraft may be rotated and/or oriented to a desired angle with the magnetic field lines, as was also discussed above.

Figure 10:
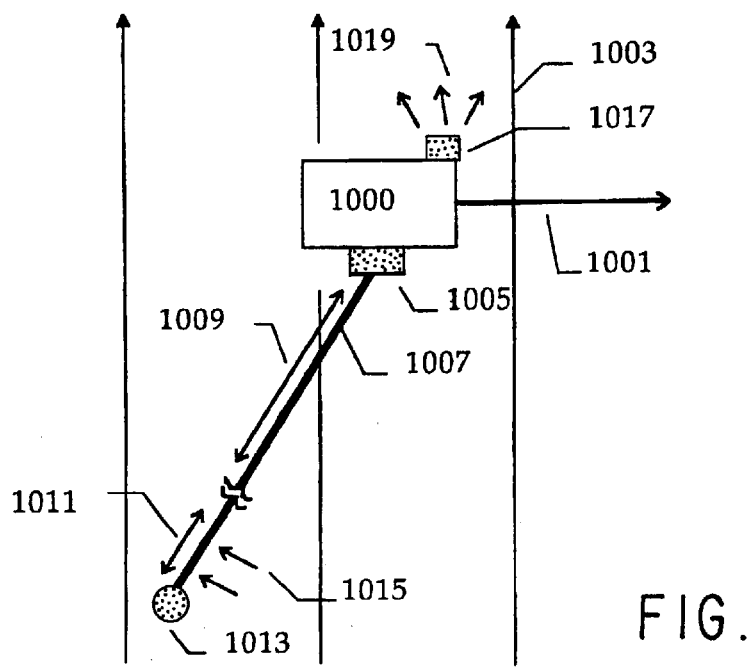
FIG. 10 shows the use of a portion of the tether structure as a thermal radiator and plasma contactor.

FIG. 10 shows an embodiment of the present invention wherein the plasma contactor and the resistive load are structurally part of the conductive tether. In FIG. 10 spacecraft 1000 has a state vector 1001 that causes it to pass through magnetic field 1003. Spacecraft 1000 has a tether control and deployment system 1005 that is connected to a conductive tether 1007 having an end mass 1013. A contactor portion 1015 of the conductive tether 1007 near end mass 1013 is adapted to contact the space plasma so as to receive or emit electrons. This may be the bare wire strands of a wide Hoytether, or it may be any other plasma contactor means that can be conveniently made electrically part of the Hoytether structure, such as points or metal fuzz. A second resistive portion 1009 of tether structure 1007 is adapted to be a resistive load. This may be done by making a portion of the tether structure from a material, such as nichrome steel wire, that has suitable electrical resistance The large surface area of the Hoytether provides an excellent radiator structure into the three degree Kelvin radiation sink of outer space.

Figure 11:
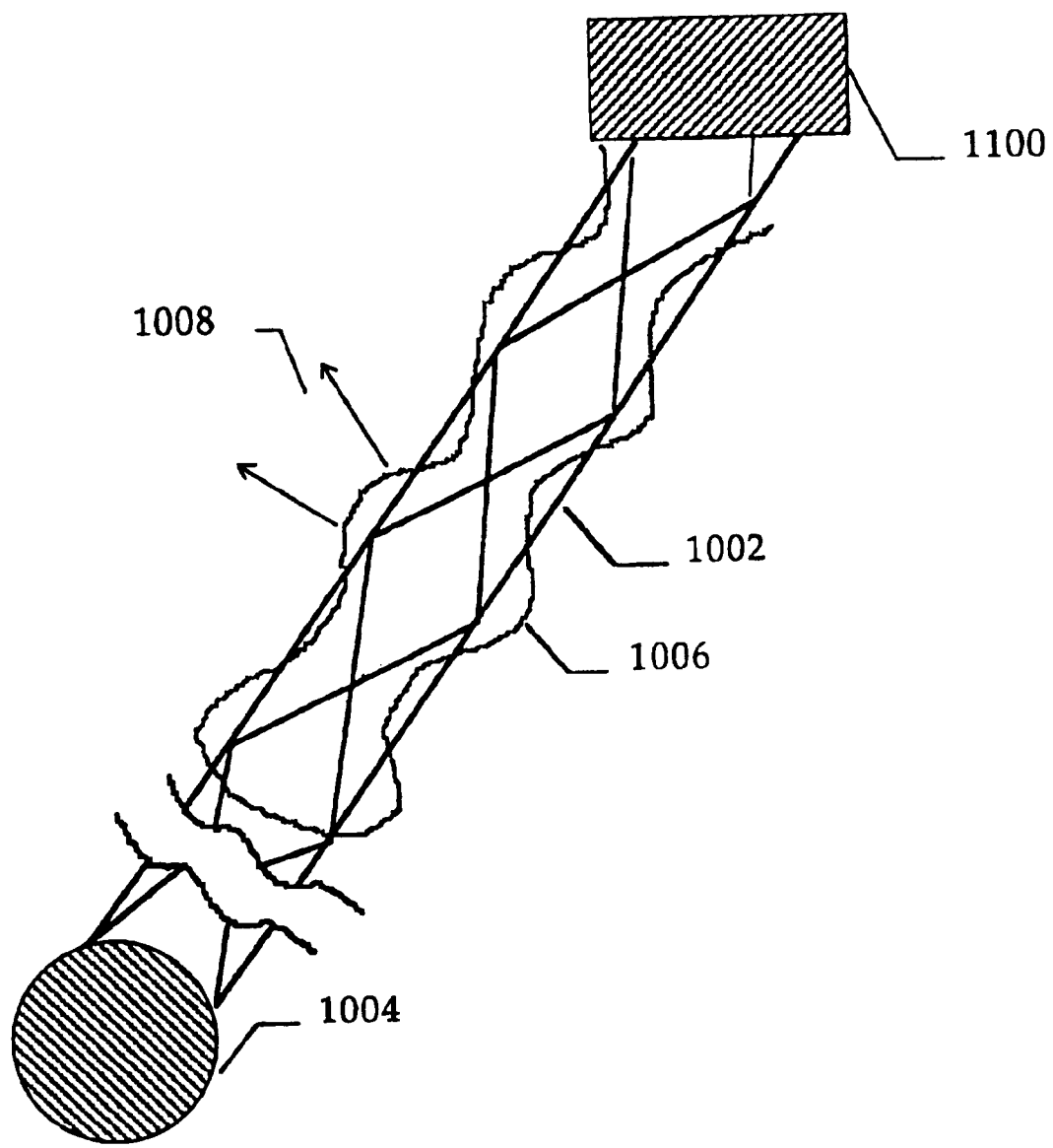
FIG. 11 shows the braiding of an ohmic resistive load into the tether structure.

FIG. 11 shows an alternative embodiment of the load resistance/radiator structure of the present invention. In FIG. 11, a biline Hoytether 1002 is attached to its control and deployer system 1100 on a spacecraft, not shown, and to a tether end mass 1004. A resistive load, 1006 is woven into the Hoytether structure, whereby this load 1006 and the section of the Hoytether 1002 into which it is woven act together as a thermal radiator allowing photons 1008 to radiate into the thermal sink of outer space.

The following detailed analysis of the present invention will help those skilled in the art to better understand and use the present invention.

Figure 12:
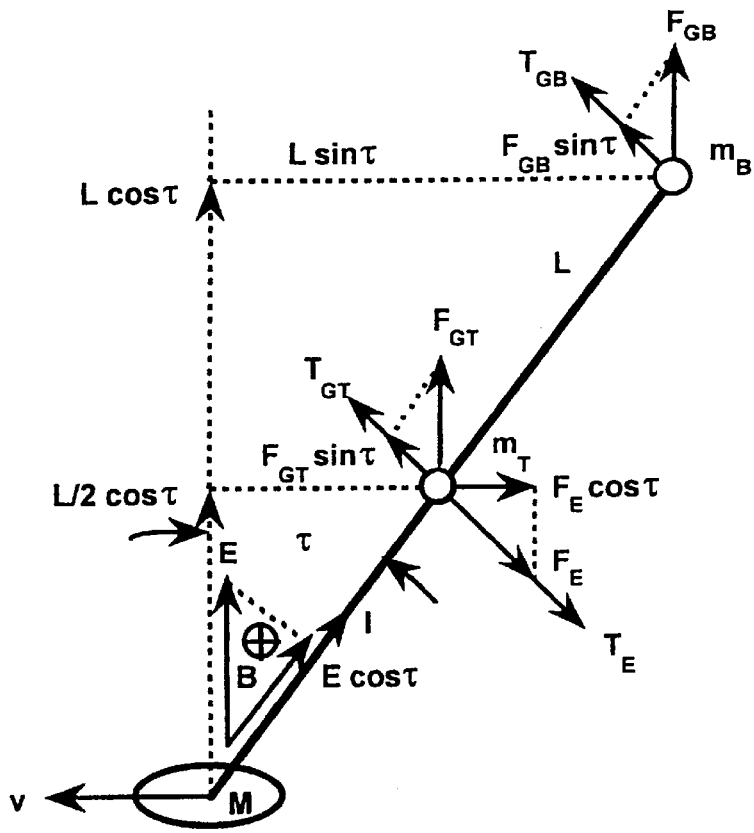
FIG. 12 is a force diagram showing the forces and torques on an upward deployed conducting tether due to the motion of the host spacecraft through the magnetic field of the Earth.

Electrodynamic Drag Analysis:

The following is an optimization analysis of the electrodynamic drag produced by a conducting tether deployed from a host spacecraft that it is to deorbit. The force and torque diagram used in the analysis is shown in FIG. 12, which shows the forces and torques on an upward deployed conducting tether due to the motion of the host spacecraft through the magnetic field of the Earth.

Physical Constants and Assumptions:

The analysis that follows will use the following physical constants and assumptions:

Newton's gravitational constant $G=6.67\times10^{-11}$ m$^3$/kg-s$^2$.

Mass of Earth $M_e=5.976\times10^{24}$ kg.

Radius of Earth near equator $R_e=6378$ km.

Assumed host spacecraft altitude $h=622$ km.

Assumed host spacecraft orbital radius $a=7000$ km.

Host spacecraft orbital velocity $w=\omega a=[GM_e/a]^{1/2}=7546$ m/s.

Vertical gravity gradient at spacecraft $2\Gamma=2GM_e/a^3=2.32\times10^{-6}$ s$^{-2}$.

Centrifugal gradient at spacecraft $\omega^2=GM_e/a^3=1.16\times10^{-6}$ s$^{-2}$.

Combined gradient at spacecraft $3\Gamma=3GM_e/a^3=3\omega^2=3.49\times10^{-6}$ s$^{-2}$.

Magnetic field of Earth (tilted dipole approximation):

Magnitude $B_o=35$ μT=0.35 gauss.

Angle between magnetic pole and spin pole 11.5°.

Field components at spacecraft with altitude a and angle β between radius vector of spacecraft and magnetic equatorial plane.

Horizontal $B_H=B_o(R_e/a)^3 \cos\beta=26.5$ μT $\cos\beta$.

Vertical $B_V=2B_o(R_e/a)^3\sin\beta=52.9$ μT $\sin\beta$.

Electrodynamic Tether Constants and Assumptions:

The electrodynamic tether is assumed to be made of a conducting metal, and have a length L, density d, resistivity r, and cross-sectional area A that is constant along the length of the tether. If the tether is a single round wire of diameter D, then the cross-sectional area is $A=\pi D^2/4$. Because of the micrometeorite and space debris hazard, however, it is likely the tether will be made up of redundantly interconnected multiple lines whose individual cross-sectional areas add up to A. Given these assumptions, the tether mass is then $m_T=dLA$, while the end-to-end tether resistance is $R_T=rL/A=rdL^2/m_T$.

Specific Conductivity Parameter:

The choice of the metal conductor to be used in a space tether is determined by a combination of low resistivity (high conductivity) and low density, with cost, strength, and melting point as secondary considerations for certain applications. Copper has a resistivity $r=17.0$ nΩ-m, a density $d=8933$ kg/m, and a "specific conductivity" of $1/rd=6,585$ m$^2$/Ω-kg. Aluminum has a resistivity $r=27.4$ nΩ-m, which is significantly greater than that of copper, but it has a much lower density of $d=2700$ kg/m$^3$. As a result, aluminum's "specific conductivity" of $1/rd=13,500$ m$^2$/Ω-kg is twice the conductivity per unit mass of copper. Silver, because of its higher density and higher cost, is not competitive as an electrodynamic space tether even though its resistivity of 16.1 nΩ-m is slightly better than that of copper. An alternate candidate material would be beryllium, with a resistivity $r=32.5$ nΩ-m, density $d=1850$ kg/m$^3$, and a "specific conductivity" of $1/rd=16,630$ m$^2$/Ω-kg, slightly better than that of the much cheaper aluminum. Beryllium also has a higher melting point at 1551 K than aluminum at 933 K, so some of its alloys may be a preferred material for some electrodynamic applications despite its higher materials cost. Unfortunately, despite decades of metallurgical research by the nuclear power industry, highly ductile alloys of beryllium have not been found, so it is difficult to pull beryllium into wire. As a result, because of its high specific conductivity, low cost, and ready availability in ductile wire form, it will be assumed for this analysis that the electrodynamic tether will be made of aluminum wire.

Typical Resistance Values:

To be economically competitive, the mass of the tether needs to be a small fraction of the mass of the host spacecraft it is required to deorbit. Since a typical constellation spacecraft has a mass of about 1000 kg, a typical Terminator Tether™ with a mass that is 2% of the host spacecraft mass would consist of a deployer/controller package with a mass $m_D=10$ kg, containing an aluminum tether with a mass $m_T=10$ kg with a volume of $LA=m_T/d=3.70\times10^{-3}$ m$^3$. If this 10 kg of aluminum were formed into a tether with a length of L=2 km and a cross-sectional area of A=1.85 mm², then the end-to-end resistance of the tether would be R=rL/A= rdL²/m$_T$=29.6 Ω A longer tether would have a proportionately smaller cross-sectional area and a higher resistance; for example, a 5 km long tether with the same mass would have a resistance of 185 Ω.

Orbit Inclination Assumption:

In order to make the remainder of the analysis mathematically tractable, it will be assumed that the orbit of the host spacecraft is circular and above the magnetic equator, so that the angle between the radius vector to the spacecraft and the magnetic equatorial plane is β=0 degrees. In this orbit, the velocity v of the spacecraft with respect to the magnetic field is the orbital velocity w less the rotational velocity of the magnetic field at the orbital radius a due to the once per day rotation of the Earth, or:

$$v=W-2\pi a/1day=(7546-509)m/s=7037m/s$$

This equation also shows why electrodynamic drag will not be useful for removing geostationary spacecraft from orbit. At the geostationary orbital radius of a=42,200 km, the relative velocity of the spacecraft and the rotating magnetic field of the Earth is zero.

With this assumption of an orbit above the magnetic equator, the vertical component of the Earth's magnetic field is zero and the horizontal component of the Earth's magnetic field is at right angles to both the local vertical and the direction of motion of the spacecraft. The total magnetic field seen by the host spacecraft and its Terminator Tether™ is then orthogonally horizontal and has the magnitude:

$$B=B_H=B_o[R_e/a]^3 \cos \beta = 26.5 \mu T.$$

Where for simplicity the subscript H will be dropped for the remainder of this analysis.

This orbit, with its inclination of 11.5° with respect to the spin equator, will not stay in the plane of the magnetic equator, but will vary ±11.5° above and below it as the Earth rotates, causing a variation in magnetic field strength of ±0.5 μT, as well as a slight variation in angle. This 2% variation is negligible in terms of the other uncertainties in this analysis. It is not until the orbital inclination of the host spacecraft orbit reaches 60°, where cos 60°=0.5, that there is a significant drop in the expected magnitude of the electrodynamic drag forces calculated in this analysis.

Electromagnetic Drag Effects in Polar Orbit:

In many medium Earth orbit communication satellite constellations, there are a significant number of spacecraft at high inclinations and in nearly polar orbits. The high inclination spacecraft, with inclinations between 60° and 78.5°, will all have orbits that stay between the magnetic poles. Although the amount of electrodynamic drag will be significantly less than that experienced by spacecraft with orbits at lower inclinations, the direction of the induced electric fields in the tether will always be in the proper direction. If the tether is vertically upward, the outer tip of the tether will be positively charged and the bare wire in the tether will pull electrons out of the surrounding space plasma, while the electron emitter at the host spacecraft end will eject the electrons back into the space plasma to complete the circuit.

For spacecraft in near polar orbits with inclinations between 78.5° and 90°, however, there will be much more drastic variations. First of all, for a spacecraft in a 90° orbit that happens to pass directly over the magnetic poles, there is no horizontal component of the magnetic field when it is passing over one of the magnetic poles, so no voltage is generated in the tether during that part of the orbit, while the horizontal component of the magnetic field near the magnetic equator, while strong in magnitude, is along the spacecraft velocity vector, so no voltage is generated in the tether in that part of the orbit either. As a result, there will be negligible electrodynamic drag experienced by the host spacecraft during that particular orbit. The Earth is rotating, however, and the magnetic pole is rotating with it. A few orbits later, the host spacecraft will be passing over the Earth's spin pole at a point where the horizontal component of the magnetic field is exactly at right angles to the direction of motion of the spacecraft, so the full voltage is generated in the tether. When passing over the spin pole, the spacecraft radius vector is at an angle of 11.5° from the magnetic pole and at an angle β=78.5° away from the magnetic equatorial plane. With these assumptions, the magnitude of the horizontal component of the magnetic field at the Earth's spin pole is a respectable:

$$B=B_o[R_e/a]^3 \cos 78.5° = 5.28 \mu T$$

or 20% of the maximum value experiences by spacecraft orbiting above the magnetic equator. This value will drop slightly as the orbit continues, then build back up as the spacecraft passes over the opposite pole. As the Earth continues to rotate, bringing the magnetic pole again under the orbit, and the interaction of the tether with the horizontal component of the magnetic field again drops to zero. The average coupling of a tether to the Earth's magnetic field over all polar trajectories has been calculated to be 12.3 percent.

A problem experienced only by spacecraft with orbit inclinations greater than 78.5°:

The spacecraft will no longer be traveling from west to east with respect to the magnetic field axis, but will have a retrograde motion as it moves through the magnetic field. As a result, the voltage generated by the motion of the tether through the Earth's magnetic field will switch direction. The outer tip will be negatively charged and will attempt to collect ions, which is a much less efficient process than collecting electrons.

There are a number of solutions to this problem. The first is to increase the mass and length of the tether supplied to a spacecraft assigned to a polar orbit, so that higher voltages, currents, and drag are generated during the limited times the spacecraft is passing over the poles in the right direction. The second is to supply a tether with plasma contactors at both ends that can emit electrons from either end, allowing the current to flow either way, depending upon which direction the spacecraft is passing around the magnetic pole. The third is to utilize the first number of passes to torque the orbit of the spacecraft until the orbit inclination has been shifted below 60°, then turn on the electrodynamic drag full time to deorbit the spacecraft from this more favorable orbit inclination. This orbit torqueing maneuver is accomplished by activating the electrodynamic drag mechanism only when the magnetic field orientation is such that a strong out-of-plane component of force is created. This orbit torqueing maneuver can be augmented by switching to a propulsion mode, where power saved in the batteries during the drag force mode is pumped back into the tether when the magnetic field is in the opposite direction, applying electrodynamic propulsion to torque the orbit even further. With the tether at a large and stable trailing orientation, the coupling to the magnetic field can be significant to a vertical tether.

In summary, spacecraft in near-polar orbits might take longer to bring down, and might have to utilize specially designed Terminator Tethers™ that might cost and mass more than the simpler Terminator Tethers™ usable in lower inclination orbits, but a Terminator Tether™ can still remove a spacecraft from a polar orbit when desired.

The inventors now present a detailed analysis and optimization of a typical Terminator Tether™ attached to a typical host spacecraft in a typical low inclination orbit.

Electromotive Generation of Voltage and Current in the Tether:

When an object is moved at a velocity v through a magnetic field B, an electric field is generated in the frame of reference of the moving object given by:

$$E = v \times B = vB$$

where the magnetic field B of the Earth, being mostly tangent to the Earth's surface in the north-south direction, is at right angles to the velocity vector v of the spacecraft, assumed to be orbiting in a generally west-east direction. The direction of the electric field E will be at right angles to both v and B, or along the local vertical. It should be noted that this electric field exists in the moving frame of reference because a moving magnetic field creates an electric field. No object actually has to be there, but if it is, then the relative motion of the magnetic field of the Earth will not only apply magnetic forces to whatever material the object is made out of, but electric forces too.

Note also that the velocity used in this equation is the relative velocity between the object and the magnetic field. Because the Earth's magnetic field rotates with the Earth, the motion of the magnetic field must be subtracted from the orbital velocity of the object to obtain the relative velocity.

Voltage generation in a Conducting Tether:

If the moving object is a long conducting wire of length L, the electric field E, generated in the wire produces a voltage V between the opposite ends of the wire given by:

$$V = E \cdot L = EL \cos \tau = vBL \cos \tau$$

where τ is the angle between the length vector L of the tether and the electric field vector E, assumed to be in the vertical direction at right angles to the velocity vector v in the plane of FIG. 12 and the magnetic field vector B out of the plane of FIG. 12. A typical value for the voltage level built up in a vertically oriented tether with length L=5 km and τ=0, moving at a velocity of v=7037 m/s through the Earth's horizontal magnetic field of strength 26.5 μT, is 932 V, or 0.186 V/m. Spacecraft in higher inclination orbits would experience somewhat smaller electric fields. For calibration, the voltage measured between the ends of the 19.5 km long TSS-1R tether was 3500 V, or 0.175 V/m.

Contacting the Space Plasma:

Although a voltage will build up between the ends of the conducting tether, no current will flow unless the circuit is completed. The circuit cannot be completed with another wire, for it too will have a similar voltage generated in it by the moving magnetic field. Fortunately, empty space is not empty, and in near-Earth regions not too distant from the Earth's atmosphere there exists highly electrically conductive space plasma, kept partially ionized by radiation from the Sun. The electron and ion density varies from the dark to light side, with altitude, with season, with sunspot cycle, with contamination level, etc. but it typically varies from $10^{11}$ to $10^{13}$ electrons/cc.

Fortunately, it has been found that if a bare conductive surface such as the spherical Italian spacecraft in the TSS-1R experiment, or the long bare wire to be used in the ProSEDS experiment, or a multiline conducting wire Hoytape mesh, is charged to a few hundred volts, the bare conductor will readily pull electrons out of the space plasma. So all that is needed to complete a connection to the space plasma at the positively charged (upper) end of the tether is a sufficient large area of uninsulated conductor.

It is more difficult to eject electrons from a wire or to collect positive ions from the space plasma. Although it is conceivable that a very large area at the other end of the tether could collect enough ions to complete the circuit as was demonstrated during the TSS-1R mission when the Shuttle orbiter was found to be an adequate plasma contactor for over an amp of current, the present method chosen is to use an electron emitter of some sort, either a hot cathode, a plasma cathode or contactor, a field-emission device, or something similar. Once provisions have been made at both ends of the tether to allow the flow of electrons out of one end of the tether and into the other end, and the altitude of the host spacecraft is not too high, then there will be sufficient conductivity in the space plasma surrounding the host spacecraft to allow current to flow through the tether.

Current Flow In The Tether:

The amount of current I flowing through the tether depends upon the total resistance R in the circuit. This resistance will consist of three components, the effective resistance of the plasma, the resistance of the tether, calculated earlier as $R_T = rL/A = rdL^2/m_T$, and a control resistor $R_C$, which will be varied as needed to optimize the Terminator Tether™ performance. There will also need to be a parasitic load on the current in the form of a charging device to charge some batteries. The batteries in turn will be used to power the control and communication circuits, and drive the electron emitting devices at the negative end of the tether. A well-designed Terminator Tether™ will thus be completely self-powered, except for an initial charge in the batteries to provide electrical power for the deployment and startup procedure. For simplicity of analysis it will be assumed that this battery charging load, which absorbs power like a resistor, but which stores it and uses it later instead of dissipating it immediately as heat, is included in the control resistor $R_C$. Normally, this load would act as a "base resistance" below which the control resistor could not be lowered, but since the charging circuit can be turned off when desired, and operations continued without interruption using the power stored in the batteries, it will be assumed that the control resistor can be taken to near zero value in those circumstances where the space plasma conductivity is low, or the magnetic field is in the wrong orientation and the voltage being generated in the tether is not large. Under these circumstances, lowering the control resistor to near zero allows a much higher current to flow for a given generated voltage, thus increasing the power being dissipated in the tether and maintaining a high level of electrodynamic drag on the host spacecraft.

A properly designed Terminator Tether™ will have plenty of bare metal area for electron collection at the positive end, while the electron emitters at the other end are efficient in terms of emitting large electron currents at low voltages and therefore low powers, while at the same time the mass, length, and area of the conducting tether have been made such that the resistance of the tether is moderately high. Under these conditions, the effective resistance of the space plasma will be much less than the design resistance of the tether. To make the mathematics more tractable it will be assumed that the plasma resistance is can be neglected and that the voltage available to drive the tether is the full voltage generated by the moving magnetic field. Although voltage will be needed to power the electron emitter, whatever its form, it will be assumed that the required voltage and power will be supplied by the batteries. The batteries in turn will be powered by the battery charging circuit, whose effective resistance is included in the control resistor (except for those short periods when the plasma or magnetic field interactions are weak).

Given all these assumptions concerning the total resistance in the circuit, the current I flowing through the tether is then given by:

$$I=V/R=vBL \cos \tau/(R_C+rdL^2/m_T)$$

A typical current level can be estimated by assuming that the control resistance $R_C$ should be about the same size as the tether resistance $R_T$, which for an aluminum tether with resistivity r=27.4 nΩ-m, density d=2700 kg/m$^3$, length L=5 km, and mass $m_T$=10 kg, is $R_T$=185 Ω, giving a total resistance, including the control resistance $R_C$, of R=370 Ω. Thus the current flowing though a tether of length L=5 km, generating a voltage of V=932 V, would be I=V/R=2.52 A.

Power Dissipation Analysis:

The induced current I flowing through the tether resistance $R_T$ will generate heat in the wire, which will be radiated into space and lost. That radiated energy must come from somewhere. There is also power taken out of the current flow by the battery charging circuit and ultimately dissipated. In order to conform to energy conservation laws, this power and energy must come from a decrease in the total kinetic and potential energy of the host spacecraft, causing it to deorbit. Set forth below is a detailed, optimized force analysis which will calculate the drag force on the host spacecraft. In this section, by using some simplifying assumptions, it is possible to produce a general argument based on energy conservation laws, which will illustrate the broad scope of the present invention.

For this energy conservation analysis it will be assumed that the plasma resistance is small compared with the tether resistance, and that the control resistance is equal to the tether resistance:

$$R_C=R_T=rL/A=rdL^2/m_T$$

Assume that the ballast mass at the end of the tether is a large piece of the defunct host spacecraft, such as a solar panel, antenna, or battery pack, so that the gradient force is large and the tether is always oriented along the vertical so that the angle τ=0°. Also assume the spacecraft is in an orbit above the magnetic equator and thus is moving at right angles to the Earth's magnetic field, so that the angle between the orbital velocity vector and the magnetic field vector is 90°, and the electric field vector is in the vertical direction, aligned perfectly with the tether length vector. Under these ideal conditions, the voltage between the ends of the tether is given by:

$$V=E \cdot L=(v \times B) \cdot L=vBL$$

The current in the tether is then just:

$$I=V/(R_C+R_T)=vBm_T/2rdL$$

The power dissipated as ohmic heating in the tether is then given by:

$$P=IV=(vB)^2m_T/2rd$$

This equation shows the interesting result that the power dissipated does not depend upon the length or the area of the tether (within reason), but only the mass of the tether $m_T$, the resistivity r and density d of the tether material, and the velocity v of the conducting tether through the Earth's magnetic field B.

For a typical aluminum tether of mass $m_T$=10 kg, the power dissipated is an impressive P=2350 W. Even if only a small fraction of this power is dissipated in a real system, the kinetic energy of the host spacecraft would suffer a significant energy loss with time.

Orbital Energy Extraction Analysis:

The total energy U of a spacecraft of mass M in orbit around the Earth consists of two components, its positive orbital kinetic energy and its negative gravitational potential energy. If a circular orbit of altitude h and radius $a=R_e+h$ is assumed, then the total energy of the spacecraft moving at a velocity $w=(GM_e/a)^{1/2}$ is:

$$U=+Mw^2/2-GMM_e/a=-GMM_e/2a$$

The system will be dissipating energy in the tether to decrease the energy U of the unwanted spacecraft from its relatively low negative value in a high Earth orbit to a greater negative value in a lower Earth orbit. To give a specific example, an unwanted spacecraft with a mass of M=1000 kg (a metric ton) in an orbit with an altitude of h=1000 km and a high orbital radius of $a(H)=R_e+h=7371$ km, then its (negative) total energy is:

$$U(H)=-GMM_e/2a(H)=-27.1 \text{ GJ or } -27.1 \text{ MJ/kg}$$

It is desired to lower the spacecraft to an orbit with an altitude just outside the atmosphere of h=200 km or a lower orbital radius of $a(L)=R_e+h=6571$ km, where atmospheric drag will finish the job. The total (negative) energy of a metric ton spacecraft at 200 km altitude is:

$$U(L)=-GMM_e/2a(L)=-30.4 \text{ GJ}$$

Thus, the amount of energy needed to be dissipated in order to move the 1000 kg spacecraft from a 1000 km orbit with a total energy U(H)=−27.1 GJ down to a 200 km orbit with energy U(L)=−30.4 CJ is:

$$dU=U(H)-U(L)=3.3 \text{ GJ}.$$

The decay time T of a metric ton spacecraft moving from a 1000 km altitude orbit to a 200 km altitude orbit with an energy difference of dU=3.3 GJ, when its energy is being dissipated at a power of P=2350 W by a typical aluminum tether massing just 10 kg or 1% the mass of the spacecraft, is found to be T=dU/P=16 days.

The actual decay time will be longer than this. If the electrodynamic drag force is very large, and becomes larger than the gravity gradient forces pulling on the ends of the tether, then the tether will tend to align itself along the magnetic field lines instead of across them, and the drag force will decrease because of the small angle between the conductor length and the magnetic field lines. The tether current will need to be controlled until the angle of the tether settles into an angle determined by the balance between these two forces. These electrodynamic torque vs. gradient torque dynamic interaction effects are discussed in the next section.

Force and Torque Balance Analysis:

It is now possible to calculate the forces and torques on the tether. It is also possible to use the fact that the electrodynamic and gravity forces and torques on the tether must balance each other out to calculate and teach some optimum values for some of the Terminator Tether™ parameters.

Electrodynamic Force and Torque:

As discussed above, both theory and experiment show that: provided the conducting tether is moved rapidly through the Earth's magnetic field in order to generate a voltage across it, and provided good contact is made with the space plasma, the conducting tether will have a current flowing through it. When a wire (moving or not) carrying a current I is embedded in a magnetic field B, there will be an electrodynatnic force $F_E$ generated on each element of the wire. The electrodynamic force will be at right angles to the magnetic field vector and the length vector of the wire element, with a magnitude given by:

$$F_E = J \times B = ILB$$

where B is the horizontal component of the magnetic field, which is perpendicular to the assumed magnetic equator orbit plane, while the tether length vector L is assumed to lie in the orbit plane. If, as will be the case most of the time, the electron current is leaving the space plasma and entering the tether along the length of the tether, then IL needs to be replaced with an integral of the current along the length of the tether.

Note that the electrodynamic force amplitude or direction is not directly dependent on the motion of the tether through the Earth's magnetic field. The electrodynamic force would be the same if the tether were not moving and the current was being supplied by a battery. Since the current I is a function of the orbital velocity, however, there is a secondary dependence of the electrodynamic force magnitude on the orbital velocity, but not its direction. The electrodynamic force is always at right angles to the conductor, and stays at right angles to the conductor as the angle $\tau$ varies, as shown in FIG. 12.

Assuming that the electrodynamic drag force is applied uniformly along the length of the tether, it is possible to make the simplifying assumption that the integrated force is effectively applied at right angles to the center of mass of the tether at the point L/2 as shown in FIG. 12. The electrodynamic torque on the tether is then:

$$T_E = F_E L/2 = IBL^2/2 = vB^2L^3 \cos \tau / 2(R_C + rdL^2/m_T) = vB^2L^3 \cos \tau / 2R$$

Gravity Gradient Forces and Torques:

When a tether and its ballast end mass are deployed from a host spacecraft, the gravity gradient force field of the Earth, combined with the orbital centrifugal gradient force field, will cause the tether to deploy either up or down from the host spacecraft. The direction desired depends on which end of the tether is connected to the electron emitter. Normally, the electron emitter will be on the end attached to the host spacecraft, in which case the desired direction of deployment will be upward so that the induced voltage in the tether will produce an excess of electrons at the electron emitter end of the tether. The desired upward direction is chosen by having the deployer eject the ballast mass in the upward direction. Once the ballast mass has been started in that direction, the centrifugal force due to the orbital motion of the ballast mass will cause the ballast mass to continue to accelerate in the upward direction until it is brought to a halt by the full deployment of the tether.

If there were no electrodynamic or atmospheric drag, the equilibrium direction of the tether would be exactly along the vertical, since the combined gradient field is a maximum in that direction. Because a significant amount of electromagnetic drag is expected, the actual angle of the tether with respect to the local vertical will be at some angle $\tau$, lagging behind the spacecraft motion in the plane of the orbit, as shown in FIG. 12. In the following analysis shows that there is an optimum angle for $\tau$ that produces the largest electrodynamic drag force on the host spacecraft without producing tether instability.

The combined vertical gravity gradient and centrifugal gradient field $3\Gamma$ acting on the ballast mass $m_B$ at the end of the tether of length L will produce a gradient force $F_{GB}$ given by:

$$F_{GB} = -3\Gamma m_B L \cos \tau$$

The strength of the force depends not only on the ballast mass $m_B$ and the strength of the gradient field $3\Gamma$, but also the component along the radial direction of the distance of the ballast mass from the center of mass, which is $L \cos \tau$. This force acts in the vertical direction along the radius vector leading from the ballast mass away from the center of the Earth. The amount of gradient force is not large. For a ballast mass of $m_B = 10$ kg and a tether length of L=5 km, the gradient force is about 0.175 N.

As can be seen in FIG. 12, the component of this gradient force that is at right angles to the tether, given by $F_{GB} \sin \tau$, will produce a torque $T_{GB}$ on the tether that tends to restore the tether toward the vertical, lessening the angle $\tau$.

$$T_{GB} = LF_{GB} \sin \tau = -3\Gamma m_B L^2 \sin \tau \cos \tau$$

The tether mass $m_T$ also contributes to the gradient force and torque. If it is assumed that the tether has a uniform cross section, then it is possible to replace the distributed mass of the tether with an equivalent point mass $m_T$ placed at the center of mass of the tether, which is the point L/2 along the tether, and a distance L/2 cos $\tau$ in the radial direction. The gradient force due to the tether mass is then:

$$F_{GT} = -3/2 \Gamma m_T L \cos \tau$$

While the gradient torque is:

$$T_{GT} = -L/2 F_{GT} \sin \tau = -3/4 \Gamma m_B L^2 \sin \tau \cos \tau$$

The total gradient torque attempting to restore the tether to its vertical orientation is then:

$$T_G = T_{GB} + T_{GT} = 3\Gamma(m_B + m_T/4)L^2 \sin \tau \cos \tau$$

It is important to notice the variation of the total gravity gradient torque as the tether angle $\tau$ is varied. Since the gradient force is always in the radial or vertical direction, there is no torque on the tether when the tether is vertical, as is the case when there are no aerodynamic or electromagnetic drag forces. Once the drag forces become important and start to apply torque to the tether, increasing the tether angle $\tau$, those drag torques causing an increase in tether angle $\tau$ will be opposed by a rising gradient torque which will attempt to decrease the tether angle. For small tether angles, the gradient torque increases first linearly with $\tau$, then as sin $\tau$, since cos $\tau$ is near unity for small $\tau$, then at $\tau=45°$ the gradient torque reaches its maximum, where sin $\tau=\cos \tau=0.707$ and sin $\tau \cos \tau=0.50$. When this angle is reached, the tether is a point of catastrophic instability, for if there is a further increase in the electrodynamic drag force, causing the angle $\tau$ to become greater than 45°, the gradient torque, instead of growing stronger to counteract the increased drag torque, will become weaker and the tether angle will go rapidly to 90°.

To restore control to the tether angle if the instability occurs, it will be necessary to turn off the electrodynamic drag forces by shutting off the current flow through the tether. The $\tau=90°$ position for the tether and ballast mass is a gravitationally unstable orientation. After a time, slight fluctuations in the gravity field will allow the gradient force to slowly take over and restore the tether to the vertical orientation, which, unless it can be controlled in some way, is equally likely to be up or down. It would therefore be desirable to maintain control of the tether angle so as to avoid the tether angle getting into the region of instability.

Torque Balance on the Tether:

The angle $\tau$ of the tether is determined by a balance between the electrodynamic torque $T_E$ attempting to increase the angle $\tau$ and the gradient torque $T_G$ attempting to decrease the angle $\tau$. Balance is achieved when the two torques are equal:

$$T_E = T_G = T_{GB} + T_{GT}$$

or:

$$vB^2L^3 \cos \tau / 2R = 3_\Gamma(m_B + m_T/4)L^2 \sin \tau \cos \tau$$

Simplifing and rearranging yields an equation giving us the angle $\tau$ at which torque balance occurs:

$$\tau = \arcsin[vB^2L/6_\Gamma(m_B + m_T/4)R]$$

The physical interpretation of this equation is that the maximum electrodynamic force that can be sustained on the tether is limited by the gradient force on the tether. It is possible to increase the electrodynamic force by decreasing the total resistance R of the tether (for example, by using a tether with a larger mass and a lower tether resistance), but if the tether resistance is too low, then the quantity in brackets becomes greater than unity and this equation has no solution, indicating that the tether has reached an angle where instability sets in.

To maintain control of the tether angle, it will be necessary to vary the control resistance of the tether to compensate for variations in magnetic field strength and direction, plasma density (which affects the plasma resistance), and other factors, and thereby maintain the tether at an intermediate angle where both the electrodynamic and gradient forces are at an appreciable level and balance each other.

Optimization of Tether Angle:

At first glance, it might seem that the optimum angle for the tether would be 45°, since at that angle the gradient torque is largest and therefore can counteract a larger electrodynamic drag force. However, since the 45° angle is the point where instability sets in, it is desirable to set the tether angle at some value below 45°. The optimum angle is that which maximizes the horizontal or drag component of the electrodynamic force. This optimum angle $\tau$ is derived from the equation for the horizontal component of the electrodynamic force, or the electrodynamic drag force, since it opposes the host spacecraft motion:

$$F_{ED} = F_E \cos \tau = 6[m_B + m_T/4]\Gamma L \sin \tau \cos^2\tau$$

By setting the partial derivative $\partial F_{ED}/\partial \tau = 0$ and solving, it is possible to calculate that the optimum angle for the tether that gives the maximum electrodynamic drag force $F_{ED}$, while still keeping the tether torques balanced and under control, is $\tau = \arctan(0.707) = 35.26°$. With this angle selected and maintained by varying the control resistor $R_C$ to compensate for variations in plasma contact resistance and variatins in the strength and direction of the Earth's magnetic field B seen at the spacecraft, the tether experience the maximum stable value for the electromagnetic drag force of:

$$F_{ED}(\max, \tau = 35.26°) = 2.31[m_B + m_T/4]\Gamma L$$

There are many ways to provide the sensing information needed to provide the feedback signals to the control resistor, but the simplest is to merely measure the drag acceleration on the host spacecraft with a set of accelerometers, and maximiize the force in the direction opposite to the host spacecraft motion. Another method would be to measure the current in the tether, and knowing the tether resistance and the amount of control resistance, calculate the power being extracted and maximize that value. Alternate methods would be to use an optical position sensor or GPS receivers at both ends of the tether to measure the angle of the tether or the position of the ballast mass with respect to the host spacecraft.

To make an estimate of the magnitude of drag force attainable, assume that a typical aluminum tether with a length of L=5 km, a tether mass of $m_T$=10 kg and a ballast mass of $m_B$=10 kg is being used. Then the maximum gradient force limited electrodynamic drag force is $F_{ED}$= 0.167 N. The power being dissipated in the canoical tether at the angle $\tau$, with $R_C = R_T = rdL^2/m_T = 185 \, \Omega$ is given by:

$$P = IR = [vBL \cos \tau]^2 (R_C + rdL^2 m_T)$$

which for an angle $\tau = 35.26°$ results in a power dissipation of 1570 W. Thus, the thrust level per unit power obtained by the typical Terminator Tether™ would be about 0.106 N/kW. This number is comparable to the value of 0.148 N/kW estimated for the much heavier and longer TSS-1R tether.

Reconciliation of Energy and Force Analysis:

By a force and torque balance analysis an optimum angle for the tether has been discovered at which it is possible to obtain a maximum in the drag component of the electrodynamic force. There is also an additional component of the electrodynamic force, the component in the vertical direction, $F_{EV=FE} \sin(\tau)$, which is downward for an upwardly deployed tether. This component of force combines with the gravity force of the Earth to effectively allow the host spacecraft to orbit a little faster than normal for that orbital altitude. It does not contribute to the deorbiting of the host spacecraft. But since this vertical component of force is created by current running through the tether, and that current is creating heat and dissipating energy as it passes through the tether, there might be some concern that the force and torque balance analysis above does not conform to the law of conservation of energy.

The inventors will now show, in a very general manner, that no matter what the tether angle, the electrical power being dissipated in the tether is exactly equal to the power being lost by the slowing of the host spacecraft.

The "deorbit power" $P_D$ that must be removed from a spacecraft moving at a velocity v when that motion is opposed by a drag force $F_{ED}$ is:

$$P_D = v \cdot F_{ED} = vF_E \cos \tau = vILB \cos \tau = I[vBL \cos \tau]$$

But, since the voltage V induced across the tether of length L and tilt angle $\tau$ moving at a velocity v through a horizontal magnetic field B is $$V = E \cdot L = EL \cos \tau = vBL \cos \tau$$

Therefore:

$$P_D = IV = P_E$$

And the deorbit power $P_D$ extracted from the slowing of the spacecraft by the drag component of the electrodynamic force is always exactly equal to the electrical power $P_E$ being dissipated as heat in the tether circuits, independent of the tether angle.

Optimization of Tether Mass Distribution:

If it is not possible to use a piece of the host spacecraft as ballast mass, then the mass of the ballast must be included in the Terminator Tether™ mass. It would be desirable to minimize the total Terminator Tether™ mass, since every kilogram saved means that another kilogram's worth of revenue-producing transponders can be added to the working payload of the host spacecraft. Given a total mass for the Terminator Tether™ and the mass of the deployer/controller unit, it is possible to optimize the mass distribution between the ballast mass and the tether mass to obtain a minimum total Terminator Tether™ mass. A well-designed Terminator Tether™ will also have most, if not all, of the deployer mass incorporated into the ballast mass.

Assume that the total Terminator Tether™ mass consists of the deployer/controller mass $m_D$, the tether mass $m_T$, and the ballast mass $m_B$, with $m_B > m_T > m_D$. Of the three mass components in the Terminator Tether™, two of them affect the electrodynamic drag performance. If it is assumed that the ballast mass is a factor X larger than the tether mass, or $m_B = X m_T$, the maxinum drag force that can be obtained is now:

$$F_{ED}(\text{max}) = 2.31 m_T (X+0.25) \Gamma L$$

If it is assumed that the control resistor has been adjusted so that this maximum value for the electrodynamic drag force is maintained as the motion of the spacecraft along its orbit moves the spacecraft into regions with different magnetic field strengths and plasma densities, then for the angle $\tau = 35.26°$, $\cos(35.26°) = 0.817$, and the maximum electrodynamic drag force in terms of the electrodynamic parameters will be:

$$0.817 v B^2 L^2 / (R_C + r d L^2 / m_T) = F_{ED}(\text{max}) = 2.31 m_T (X+0.25) \Gamma L$$

or canceling out terms and rearranging:

$$(X+0.25) = 0.353 v B^2 L / \Gamma m_T (R_C + r d L^2 / m_T)$$

It is now possible to make the further simplifying assumption that to maintain control of the tether, the control resistor needs to be roughly the same size as the tether resistance or $R_C \approx r d L^2 / m_T$. Using this assumption produces an equation for the optimum value for the ratio X of the ballast mass to the tether mass:

$$X = vB^2 / \Gamma r d L - 0.25 = -0.25 + \frac{vB^2}{12 \sin\gamma \cos\gamma \Gamma r d L}$$

$$= -0.25 \frac{\Lambda}{L}$$

Where $\Lambda$ is the "effective electrodynamic length".

If the tether is short, so that L is small, this equation indicates that the ballast mass must be increased to increase the gradient force, since it is the gradient force which determines the upper limit to the amount of electrodynamic drag force that can be generated without losing control of the tether.

Assuming the usual values for the Earth's magnetic and gradient fields, the velocity of the host spacecraft through the magnetic field, and the resistivity and density of aluminum, this equation becomes:

$$X = 10.9/L - 0.25$$

where L is in kilometers.

For a typical tether of length L=5 km, X=1.93. If the total mass for the Terminator Tether™ is 20 kg, or 2% of the host spacecraft mass, and the mass of the deployer is 10 kg, then the remaining 10 kg should be distributed so that 6.59 kg is in the ballast mass while 3.41 kg is in tether mass.

Optimization of Tether Length:

If the ballast mass consists of a piece of the host spacecraft, then the mass of the ballast does not have to be considered in the optimization of the Tether system. In this case, the optimum distribution of the Tether mass is to put as much mass as possible into the tether, with a minimum in the deployer/controller package. Under this assumption, the optimum length of the tether is determined by the desire to keep the Area-Time Product of the host spacecraft plus Tether to a minimum.

In a long tether of length L, the effective "collision" cross-sectional area is not the area of the tether, but the larger area produced by multiplying the length of the tether by sum of the width of the tether plus the width of the "target" spacecraft that would be damaged by the tether hitting it. Thus, to decrease the "area" portion of the Area-Time Product, it would be desirable to shorten the tether, making it thicker, and perhaps slightly wider, at the same time, thus keeping the same tether mass and electron collection area, and thereby maintaining the drag force and keeping the decay time at the same level. The result will be a shortening of the Area-Time Product.

If the tether is shortened too much, however, the smaller voltage generated across the shorter tether will leave less voltage margin for the operation of the plasma contactors and the battery recharge system. Since the maximum voltage that can be generated is about 200 V/km, and typical plasma contactors and battery, chargers take 25–100 V to operate, a minimum length for a Tether would be roughly 2 km. Host spacecraft operating in polar orbits, where the conditions for voltage generation are not as good, may require a tether length of 5 km or more.

Since many watts of heat power will be dissipated in the control resistor, means must usually be provided to radiate the heat away into space. One low-mass method of accomplishing this is to make the control resistor (or resistors) in the form of a long, electrically insulated, high resistivity wire similar to those used in electric blankets, but designed to operate at a higher temperature, and during the fabrication of the electrodynamic tether, incorporate the high resistivity wire (or wires) into the end of the tether closest to the control circuit by weaving or braiding the insulated high resistivity wire in with the uninsulated aluminum wire of the electrodynamic tether. The surface area of a long wire is very large, so in this extended wire configuration, exposed to the space all around it, the hot control resistor wire can self-radiate its power into cold space without incurring the mass penalty of a separate radiating surface.

Implementation:

The basic optimum structure for a Terminator Tether™ would be one of the many types of Hoytethers. A multiline (6–12 primary line) Hoytape™ will provide the largest contact area with the plasma, since both sides of the tape would be able to pass current to the plasma. If the spacing between the primary lines is chosen to be larger than twice the Debye length of the plasma, then the effective current collection area per unit length of the Hoytape is proportional to the width of the Hoytape mesh, not the diameter of the wires in the mesh. Thus, a Hoytape not only provides an assured longer life for the Terminator Tether™, but very short lengths will also provide a very large current collection areas.

The deployer for the tether can deploy the Terminator Tether™ either down or up or both. The deployer can stay attached to the spacecraft as was done in the SEDS missions, or perhaps a better alternative would have the deployer ejected from the spacecraft, with one end of the tether still attached to the spacecraft, reeling out tether as it leaves. The empty deployer would then act as a ballast mass at the end of the Terminator Tether™, which would improve the performance.

The "Remora Remover"

In addition to attaching Terminator Tethers to spacecraft before launch, it is possible to consider a missile-like application. This "Remora Remover" missile would use a Terminator Tether™ carried by a seeker missile similar to the small "hit-to-kill" missiles developed by the Space Defense Initiative Office that deployed a net loaded with oriented metal rods. The Remora Remover missile would hunt down a spacecraft that needs to be removed from space, but instead of hitting the spacecraft, the missile would be programmed to rendezvous with the spacecraft and attach itself to the host spacecraft using a hooked net, harpoon, or adhesive "sucker". The Remora Remover missile would then deploy the Terminator Tether™, which would bring down both the spacecraft and the missile.

The inventors have presented two analyses, backed up with data obtained from space flight experiments. One analysis was based on generalized energy conservation laws while the other analysis use force and torque balance arguments. Both analyses show that optimized aluminum wire tethers 2 to 5 km in length and massing just 1% to 5% of the mass of the host spacecraft can deorbit the host spacecraft in the order of a few weeks, thus mitigating the long-lived orbital debris hazard created by a constellation spacecraft after their end-of-life.

Power Augmented Operation of the Tether:

It is well known in the aerospace literature that if a spacecraft has a power supply and a conducting tether hanging from it, and the spacecraft is in an orbit or trajectory that takes it near a body, such as the Earth or Jupiter, which has both a magnetic field and a region of moderate density electron-ion plasma, and electrical current is pumped from the power supply through the tether and back through the plasma, that the current flowing through the tether will interact with the magnetic field of the body, producing forces on the tether and thence on the spacecraft, changing its orbit or trajectory. These forces can be used to increase or decrease the spacecraft altitude and/or inclination. The amount of altitude or inclination change is proportional to the ratio of the power available from the power supply divided by the mass of the spacecraft and varies with altitude. The unpowered Terminator Tether™ is a simple example of such a system, in which only altitude decrease is possible, although small amounts of both inclination increase or decrease are possible at the same time. Some typical references to this prior art are: Les Johnson, "Propulsive Small Expendable Deployer System Mission (ProSEDS)", Proceedings of the OAST $8^{th}$ Advanced Propulsion Workshop, JPL, Pasadena, Calif., 20–22 May 1997; and Les Johnson, Joe Carroll, Robert D. Estes, Enrico Lorenzini, Brian Gilchrist, Manuel Martinez-Sanchez, Juan Sanmartin, and Irwin Vas, "Electrodynamic Tethers for Reboost of the International Space Station and Spacecraft Propulsion, AIAA Paper 1996.

Since the Terminator Tether™ of the invention is normally associated with a satellite that has a power supply in the form of a solar panel combined with a storage battery, the Terminator Tether™ can be operated in the "powered propulsion" mode if desired. Such a mode would be useful when attempting to avoid a collision between the Terminator Tether™ and another spacecraft. In such cases, the power from the solar panel, augmented by the power stored in the battery, can be used to temporarily operate the Terminator Tether™ in the propulsion mode instead of the normal drag mode. This would enable to Terminator Tether™ to raise its altitude and/or increase or decrease its inclination to avoid a collision.

In addition, the Terminator Tether™ could be operated in the "power-augmented drag" mode. In this mode, there will be a current induced in the tether by the motion of the spacecraft through the magnetic field, which will cause a drag force on the spacecraft. This induced current would then be augmented by additional current in the same direction generated by the solar panel and the storage batteries in the power supply. The increased current will cause an increased drag force. If there is a significant vertical component of the magnetic field there will also be an increased force normal to the orbital plane, which will cause an increased rate of change of inclination.

When the Terminator Tether™ is operated in the "powered propulsion" or "power-augmented drag" mode, the conditions for stable optimum operation will be essentially the same as in the "unpowered drag" mode. The reason the conditions stay the same is that the maximum tether force than can be effectively utilized is limited by the strength of the gradient force, which has not changed, since the length and mass of the tether and the ballast mass has not changed for these different modes of operation. As a result the optimum operational angle for the tether is still 35.26 degrees, and the optimum ratio of ballast mass to tether mass for different tether lengths and tether material is still determined by the analysis of the invention as is set forth above.

In the analysis given above, where the optimum tether angle was found, the tether was assumed to be in the plane of the orbit and lagging behind the spacecraft motion, since in the "unpowered drag" mode, that would be its normal position, although if the component of the magnetic field along the orbit were high, there would be some tilt of the tether out of the plane of the orbit, producing a force tending to change the inclination of the orbit. In either of the "powered" modes of operation of the Terminator Tether™, however, the tilt of the tether could be forward toward the motion of the spacecraft or strongly tilted to one side or the other of the orbital plane. In all these cases, if the electrodynamic force is allowed to become too large, and the tether angle exceeds 45 degrees, the restoring force of the gradient field will drop off and the tether angle will go unstable. As a result, the optimum angle for the tether that will give the maximum stable force, whether it is a maximum drag force, and maximum propulsion force, or a maximum inclination change force, will be 35.26 degrees, and the optimum ratio for the mass of the tether versus the mass of the ballast will be the same as for the unpowered drag case.

The analysis that gave the optimum angle as 35.26 degrees assumed that the tether would be oriented like a rigid rotor. In reality, variations in forces along the tether will probably cause the tether to hang in a slightly curved shape, where the optimum angle may not be exactly 35.26 degrees from the local vertical. The optimum angle of the tether as it leaves the host spacecraft in such a case is where the drag force is largest.

The present invention is discussed in this disclosure in terms of its space applications as a Terminator Tether™ useful for the removal of unwanted satellites. It should be understood, however, that the present invention is useful in any application where a space object can use a conductive tether to produce electrodynamic force through interaction with a magnetic field. The invention, therefore, should be limited not by this description, but only by the appended claims and their equivalents.

What is claimed is:

1. A method of operating a conductive tether attached to a space object, said conductive tether being oriented at an angle to magnetic field lines of an external magnetic field and said conductive tether moving across the magnetic field lines of said external magnetic field at said angle to producing an electric current in said conducting tether and a resulting electrodynamic force acting on said tether and said attached space object comprising, Controlling the amount of electric current flowing in said conducting tether to vary the angle between the conductive tether the field lines of the external magnetic field and the electrodynamic force acting on said tether and attached space object.

2. A method as in claim 1 wherein said angle is less than 45 degrees.

3. A method as in claim 1 wherein said angle is 35.26 degrees.

4. A method as in claim 1 wherein said angle is controlled to average 35.26 degrees over time.

5. A method as in claim 1 wherein said angle is controlled to average 35.26 degrees over the length of the tether.

6. A method as in claim 1 wherein the space object and the tether connected to it are rotated about their center of mass while the conductive tether interacts with the external magnetic field.

7. A method as in claim 1 wherein the angle of the conductive tether to the external magnetic field is controlled by sensing a measurable parameter of the space object/conductive tether system.

8. A method as in claim 7 wherein the parameter is current flow in the conductive tether.

9. A method as in claim 7 wherein the parameter is the electrical power dissipated in the conductive tether and the current control system.

10. A method as in claim 7 wherein the parameter is the relative position of the space object and the position of the far end tip of the tether.

11. A method as in claim 7 wherein the parameter is the acceleration of the space object.

12. A method as in claim 6 wherein the parameter is the state vector of the space object as measured by the Global Positioning System.

13. A method as in claim 1 including the step of applying electric power to the conductive tether to change the state vector of the space object.

14. A method of operating a conductive tether attached to a space object, said conductive tether being oriented at an angle to the local vertical between said space object and a celestial body having a magnetic field having magnetic field lines external to said conductive tether; said conductive tether moving across said magnetic field lines of said external magnetic field at an angle to the local vertical to produce an electric current in said conducting tether and a resulting electrodynamic force acting on said tether and said attached space object comprising, Controlling the amount of electric current flowing in said conducting tether to vary the angle between the conductive tether the local vertical between said space object and said celestial body to vary the electrodynamic force acting on said tether and attached space object.

15. A method as in claim 14 wherein said angle is less than 45 degrees.

16. A method as in claim 14 wherein said angle is controlled to average 35.26 degrees over time.

17. A method as in claim 14 wherein the space object and the tether connected to it are rotated about their center of mass while the conductive tether interacts with the external magnetic field.

18. A method as in claim 14 wherein the angle of the conductive tether to the external magnetic field is controlled by sensing a measurable parameter of the space object/conductive tether system.

19. A method as in claim 18 wherein the parameter is current flow in the conductive tether.

20. A method as in claim 18 wherein the parameter is the acceleration of the space object caused by the electrodynamic force acting on the space object.

21. A method as in claim 18 wherein the parameter is the change in the state vector of the space object as measured by the Global Positioning System.

22. A method as in claim 14 including the step of applying electric power to the conductive tether to change the state vector of the space object.

23. A method as in claim 14 wherein the celestial body is the Earth and the magnetic field is the Earth's magnetic field.

24. A method as in claim 14 wherein the celestial body is the sun and the magnetic field is the Sun's magnetic field.

25. A method as in claim 14 wherein the magnetic field is the vector sum of the magnetic fields from all celestial bodies in the solar system.

26. A method as in claim 14 wherein the conductive tether is a Hoytether.

* * * * *